US011746061B2

(12) United States Patent
Beall et al.

(10) Patent No.: US 11,746,061 B2
(45) Date of Patent: Sep. 5, 2023

(54) OUTLET-COATED CERAMIC HONEYCOMB BODIES AND METHODS OF MANUFACTURING SAME

(71) Applicant: CORNING INCORPORATED, Corning, NY (US)

(72) Inventors: Douglas Munroe Beall, Painted Post, NY (US); Achim Karl-Erich Heibel, Corning, NY (US); Konstantin Vladimirovich Khodosevich, Saint Petersburg (RU); Kenneth Richard Miller, Addison, NY (US); Hrushikesh Govindrao Pimpalgaonkar, Pune (IN); Kunal Upendra Sakekar, Pune (IN); Min Shen, Horseheads, NY (US); Todd Parrish St Clair, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 221 days.

(21) Appl. No.: 17/052,948

(22) PCT Filed: May 3, 2019

(86) PCT No.: PCT/US2019/030657
§ 371 (c)(1),
(2) Date: Nov. 4, 2020

(87) PCT Pub. No.: WO2019/213563
PCT Pub. Date: Nov. 7, 2019

(65) Prior Publication Data
US 2021/0130242 A1  May 6, 2021

Related U.S. Application Data

(60) Provisional application No. 62/667,369, filed on May 4, 2018.

(51) Int. Cl.
*C04B 38/00* (2006.01)
*B01D 46/24* (2006.01)
(Continued)

(52) U.S. Cl.
CPC ........ *C04B 38/0009* (2013.01); *B01D 46/247* (2013.01); *B01D 46/249* (2021.08);
(Continued)

(58) Field of Classification Search
None
See application file for complete search history.

(56) References Cited

U.S. PATENT DOCUMENTS 7,384,442 B2   6/2008   Bardhan et al.
7,867,944 B2   1/2011   Konstandopoulos et al.
(Continued)

FOREIGN PATENT DOCUMENTS

CN   101288854 A   10/2008
CN   101518705 A   9/2009
(Continued)

OTHER PUBLICATIONS

International Search Report and Written Opinion of the International Searching Authority; PCT/US2019/030657; dated Jan. 8, 2020, 22 pages; European Patent Office.
(Continued)

*Primary Examiner* — Elizabeth Collister
(74) *Attorney, Agent, or Firm* — Joseph M. Homa

(57) ABSTRACT

A coated ceramic honeycomb body comprising a honeycomb structure comprising a matrix of intersecting porous walls forming a plurality of axially-extending channels, at least some of the plurality of axially-extending channels being plugged to form inlet channels and outlet channels, wherein a total surface area of the outlet channels is greater than a total surface area of the inlet channels, and wherein
(Continued)

a catalyst is preferentially located within the outlet channels, and preferentially disposed on non-filtration walls of the outlet channels. Methods and apparatus configured to preferentially apply a catalyst-containing slurry to the outlet channels and non-filtration walls are provided, as are other aspects.

23 Claims, 17 Drawing Sheets

(51) Int. Cl.
| | |
|---|---|
| *B01D 53/94* | (2006.01) |
| *B01J 35/04* | (2006.01) |
| *B01J 35/10* | (2006.01) |
| *B01J 37/02* | (2006.01) |
| *C04B 111/00* | (2006.01) |

(52) U.S. Cl.
CPC ..... *B01D 46/2429* (2013.01); *B01D 46/2455* (2013.01); *B01D 46/2474* (2013.01); *B01D 46/2484* (2021.08); *B01D 46/2488* (2021.08); *B01D 46/2494* (2021.08); *B01D 46/24491* (2021.08); *B01D 46/24492* (2021.08); *B01D 53/9431* (2013.01); *B01J 35/04* (2013.01); *B01J 35/1076* (2013.01); *B01J 37/0228* (2013.01); *B01D 46/2498* (2021.08); *C04B 2111/0081* (2013.01); *C04B 2111/00793* (2013.01)

(56) References Cited

U.S. PATENT DOCUMENTS

| | | | |
|---|---|---|---|
| 8,236,083 B2 | 8/2012 | Garcia et al. | |
| 9,291,082 B2 | 3/2016 | Everhart et al. | |
| 9,303,543 B2 | 4/2016 | Aoki | |
| 9,540,977 B2 | 1/2017 | Sadaoka et al. | |
| 9,687,785 B2 | 6/2017 | Chen et al. | |
| 9,700,842 B2 | 7/2017 | Kumazawa et al. | |
| 10,054,018 B2 | 8/2018 | Kim et al. | |
| 10,947,877 B2 | 3/2021 | Ishihara et al. | |
| 2007/0104623 A1 | 5/2007 | Dettling et al. | |
| 2007/0107227 A1 | 5/2007 | Kwon | |
| 2011/0305610 A1 | 12/2011 | Lambert et al. | |
| 2013/0028805 A1 | 1/2013 | Murasaki | |
| 2014/0154146 A1* | 6/2014 | Aoki | F01N 3/2828 422/180 |
| 2015/0152768 A1 | 6/2015 | Arulraj et al. | |
| 2016/0298512 A1* | 10/2016 | Onoe | B01D 46/2484 |
| 2017/0120192 A1* | 5/2017 | Brown | B01J 21/10 |
| 2017/0128874 A1 | 5/2017 | Hamazaki et al. | |
| 2017/0157562 A1 | 6/2017 | Kim et al. | |
| 2017/0165610 A1* | 6/2017 | Kim | B01D 46/247 |
| 2017/0167335 A1 | 6/2017 | Kim et al. | |
| 2017/0198618 A1 | 7/2017 | Kim et al. | |
| 2017/0274312 A1* | 9/2017 | Yoshioka | B01D 46/82 |
| 2018/0016958 A1 | 1/2018 | Jung et al. | |
| 2018/0023434 A1 | 1/2018 | Jung et al. | |
| 2018/0030870 A1 | 2/2018 | Jung et al. | |
| 2018/0080355 A1 | 3/2018 | Ishihara et al. | |

FOREIGN PATENT DOCUMENTS

| | | |
|---|---|---|
| CN | 105247178 A | 1/2016 |
| CN | 107060957 A | 8/2017 |
| EP | 0157651 A2 | 10/1985 |
| EP | 3176394 A1 | 6/2017 |
| EP | 3181843 A1 | 6/2017 |
| JP | 2005-146975 A | 6/2005 |
| JP | 2008-264631 A | 11/2008 |
| JP | 2013-032706 A | 2/2013 |
| JP | 2014-108404 A | 6/2014 |
| JP | 2014-198316 A | 10/2014 |
| JP | 2016-527427 A | 9/2016 |
| JP | 2016-187804 A | 11/2016 |
| WO | 2009/023143 A1 | 2/2009 |
| WO | 2009/148498 A1 | 12/2009 |
| WO | 2012/098538 A1 | 7/2012 |
| WO | 2014/194229 A1 | 12/2014 |
| WO | 2015/195809 A1 | 12/2015 |
| WO | 2016/160988 A1 | 10/2016 |
| WO | 2019/032409 A1 | 2/2019 |

OTHER PUBLICATIONS

Invitation to Pay Additional Fees of the International Searching Authority; POT/US2019/030657; dated Sep. 25, 2019, 11 pages; European Patent Office.

Japanese Patent Application No. 2020-561873, Office Action dated Mar. 25, 2022, 13 pages (6 pages of English Translation and 7 pages of Original Document), Japanese Patent Office.

Chinese Patent Application No. 201980044708.8, Office Action dated Oct. 28, 2021, 5 pages English Translation Only, Chinese Patent Office.

Indian Patent Application No. 202017052325, First Examination Report dated Jan. 19, 2022, 5 pages Original Document Only; Indian Patent Office.

* cited by examiner

OUTLET-COATED CERAMIC HONEYCOMB BODIES AND METHODS OF MANUFACTURING SAME

RELATED APPLICATION

This is a national stage application under 35 U.S.C. § 371 of International Application No. PCT/US2019/030657, filed May 3, 2019, which claims priority from U.S. Provisional Patent Application No. 62/667,369, filed May 4, 2018, and entitled "COATED CERAMIC HONEYCOMB BODIES AND METHODS OF MANUFACTURING SAME", which is hereby incorporated herein by reference in its entirety for all purposes.

FIELD

The present specification relates to particulate filters comprising a plugged honeycomb body used in filtering particles from a fluid stream, like an engine exhaust stream.

BACKGROUND

A conventional wall-flow honeycomb filter includes a ceramic honeycomb body comprising a honeycomb structure with longitudinal, parallel channels defined by porous walls. The channels are end-plugged, such as to form a checkered pattern of plugs, at the inlet and outlet end faces. Channels having their ends plugged at the inlet end face and open at the outlet end face are referred to as outlet channels, and the channels having their ends plugged at an outlet end face and open at an inlet end face are referred to as inlet channels. In a conventional channel configuration, a ratio of open channels to plugged channels at either end faces is substantially 1:1.

In operation, exhaust gas or other particulate-laden flow enters the wall-flow honeycomb filter through the inlet channels, is forced from inlet channels into the outlet channels through adjoining porous walls, and exits through the outlet channels, with the porous walls acting as filtration walls retaining a portion of the particulates from the flow.

The ceramic honeycomb body may be catalyzed to reduce pollutants such as $So_x$, $No_x$, hydrocarbons and/or carbon monoxide from the exhaust gas flow prior to the flow exiting the body. In particular, in some ceramic honeycombs, a selective catalyst reduction (SCR) catalyst can be applied as a component of a wash coat to the filtration walls.

SUMMARY

In one or more embodiments of the disclosure, a coated ceramic honeycomb body is provided. The coated ceramic honeycomb body comprises a honeycomb structure comprising a matrix of intersecting porous walls forming a plurality of axially-extending channels, at least some of the plurality of axially-extending channels being plugged to form inlet channels and outlet channels, wherein a total surface area of the outlet channels is greater than a total surface area of the inlet channels, and wherein some of the porous walls are filtration walls that separate inlet channels from outlet channels and some of the porous walls are non-filtration walls, and wherein a catalyst is preferentially disposed on the non-filtration walls.

In one or more embodiments of the disclosure, a coated ceramic honeycomb body is provided. The coated ceramic honeycomb body comprises a honeycomb structure comprising a matrix of intersecting porous walls forming a plurality of axially-extending channels, at least some of the plurality of axially-extending channels being plugged on an outlet end to form inlet channels and plugged on an inlet end to form outlet channels, wherein at least some of the porous walls of the outlet channels comprise non-filtration walls, and a surface area of the outlet channels is two times or more greater than a total surface area of the inlet channels, and a selective catalyst reduction catalyst is preferentially located within the outlet channels and preferentially disposed on the non-filtration walls.

In one or more embodiments of the disclosure, a catalyst coated ceramic honeycomb body, or coated ceramic honeycomb body, is provided. The catalyst coated honeycomb body, or coated honeycomb body, comprises a honeycomb structure comprising a matrix of intersecting porous walls forming a plurality of axially-extending channels, at least some of the plurality of axially-extending channels being plugged at an outlet end to form inlet channels and plugged at an inlet end to form outlet channels, and wherein some of the outlet channels are larger in cross-sectional area than at least some of the inlet channels 106 and the larger outlet channels include non-filtration walls, and a catalyst-containing washcoat is preferentially disposed on the non-filtration walls and comprises $0.2 \leq CR \leq 0.8$ wherein CR is a coating ratio defined as an average % loading of a washcoat containing the catalyst on and within the filtration walls divided by an average % loading of the washcoat containing the catalyst on and within the non-filtration walls.

In one or more embodiments of the disclosure, a coated honeycomb body is provided. The coated honeycomb body comprises a honeycomb structure comprising a matrix of intersecting porous walls forming a plurality of axially-extending channels, at least some of the plurality of axially-extending channels being plugged on an outlet end to form inlet channels and plugged on an inlet end to form outlet channels, wherein at least some of the outlet channels contain a filler material and a selective catalyst reduction catalyst is preferentially located within the filler material.

In one or more embodiments of the disclosure, a slurry coating apparatus is provided. The slurry coating apparatus comprises a pump providing a gas source; a face collar providing an airtight seal around a wet-coated honeycomb body; a conduit providing a connection from the pump to the face collar; and a reservoir configured to capture catalyst-containing slurry pushed out the wet-coated honeycomb body by a gas stream produced by the pump.

In one or more embodiments of the disclosure, a first method of catalyst coating is provided. The method of catalyst coating comprises providing a plugged porous honeycomb body having inlet channels and outlet channels wherein at least some of the outlet channels comprise both filtration walls and non-filtration walls; subjecting the outlet channels and the non-filtration walls to a catalyst-containing slurry; and providing gas flow from the inlet channels to the outlet channels such that at least some of the catalyst-containing slurry on the filtration walls is removed providing catalyst-containing slurry preferentially loaded onto the non-filtration walls.

In other method embodiments of the disclosure, a second method of catalyst coating a honeycomb body is provided. The second method of catalyst coating comprises providing a plugged porous honeycomb body including inlet channels and outlet channels, at least some of the outlet channels including filtration walls and non-filtration walls; providing a source of catalyst-containing slurry; applying a vacuum to the inlet channels to draw the catalyst-containing slurry into at least some of the filtration walls and non-filtration walls;

and providing a gas flow from the inlet channels to the outlet channels such that some of the catalyst-containing slurry is removed from the filtration walls such that the catalyst-containing slurry is preferentially loaded on the non-filtration walls.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings are included to provide a further understanding of the disclosure and are incorporated in and constitute a part of this specification, illustrate embodiments of the disclosure and together with the description serve to explain the disclosure.

DETAILED DESCRIPTION

Figure 1:
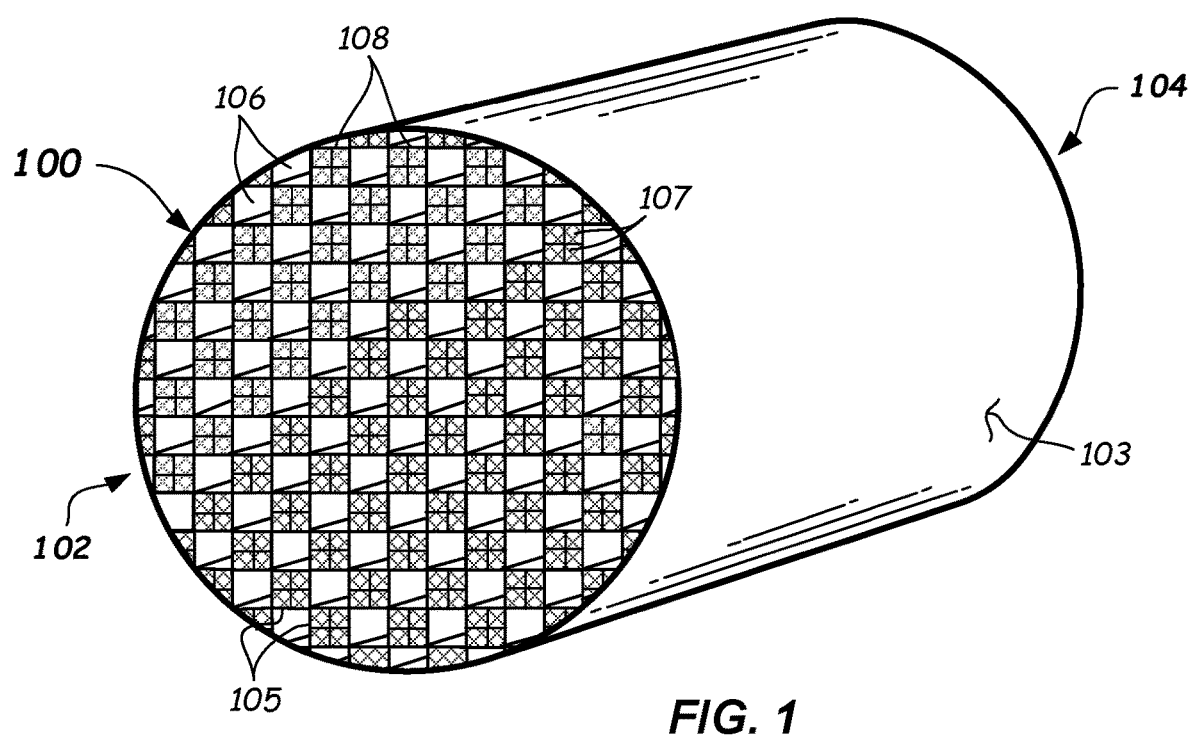
FIG. 1 schematically illustrates a perspective view of a ceramic honeycomb body according to one or more embodiments of the disclosure.

As mentioned above, conventional ceramic honeycomb bodies may comprise a catalyst-containing washcoat, such as a selective catalyst reduction (SCR) catalyst within a washcoat. In conventional practice, washcoat can either be disposed as a washcoat across the porous filtration walls of the honeycomb body or deposited within the pores of the porous filtration walls, or both, of both the inlet channels and outlet channels. When the SCR catalyst of conventional filters is provided as a washcoat to the inlet channels, the effective flow area of the inlet channels may decrease as the thickness of the washcoat on the filtration walls is increased. The resulting decrease in effective flow area and open frontal area (OFA) can result in an increase in pressure drop across the conventionally-coated ceramic honeycomb body, and a corresponding increase in system backpressure. When the SCR catalyst-containing washcoat is deposited within the pores of the porous filtration walls of conventional filters, the effective flow area of the inlet channels may still be reduced, but to a lesser amount, due to high catalyst loads needed to provide the suitable reduction in $NO_x$, such as when using an SCR catalyst. Moreover, as the catalyst load within the pores of the filtration walls increases, the soot and ash storage capacity of the body decreases since pores that would otherwise be available for collecting soot and ash particles may now be filled partially or entirely with the washcoat. Lastly, passive regeneration of soot in the conventional honeycomb filter comprising the SCR catalyst coated honeycomb body can be limited. The limitation can be due to the presence of a SCR catalyst in the filtration walls, as a portion of the nitrogen dioxide ($NO_2$) in the effluent flow will interact with the SCR catalyst rather than particulate matter within the inlet channels of the honeycomb filter.

Thus, in accordance with one or more embodiments described herein, preferentially-coated honeycomb bodies are provided, such as for use with an SCR catalyst-containing washcoat or other catalyst-containing washcoat, as are methods of preferentially coating non-filtration walls such honeycomb bodies. The coated honeycomb bodies (e.g., porous ceramic honeycomb bodies) can comprise outlet channels whose total surface area is greater than a total surface area of the inlet channels. The inlet channels and outlet channels comprise porous walls. Some of the porous walls of the coated-ceramic honeycomb body are filtration walls that separate inlet channels from outlet channels, and some of the porous walls are non-filtration walls. The non-filtration walls can separate adjacent outlet channels, subdivide the outlet channels, or extend into the outlet channels (like fins). In one aspect, a catalyst (e.g., an SCR catalyst-containing washcoat or other catalyst-containing washcoat) may be applied predominantly to and disposed non-filtration walls in the outlet channels, thus leaving a larger portion of filtration walls of the inlet channels free to capture particulates within the particulate filter, reducing backpressure, and improving passive regeneration of soot captured in the inlet channels and filtration walls.

In some embodiments, the coated ceramic honeycomb body may include inlet channels and outlet channels, the outlet channels can have a greater total surface area than the total surface area of inlet channels. For example, the coated ceramic honeycomb body can comprise a matrix of intersecting porous walls forming a plurality of axially-extending channels, wherein at least some of the plurality of axially-extending channels are plugged to form inlet channels and outlet channels. The outlet channels may have a total surface area that is greater than a total surface area of the inlet channels. The SCR catalyst is preferentially located within the outlet channels and is preferentially disposed on the non-filtration walls thereof. The SCR catalyst may be applied as a homogeneous component of a washcoat. In some embodiments, the washcoat is selectively applied across the walls of the outlet channels and selectively applied within the pores of the non-filtration walls of the outlet channels, wherein the % loading, by weight, is higher on the non-filtration walls than on the filtration walls.

In some embodiments, the non-filtration walls that are located solely within the outlet channels enable the outlet channels to comprise a higher total surface area than the inlet channels. In such an embodiment, the catalyst (e.g., SCR catalyst) may be applied and provided preferentially to the non-filtration walls within the outlet channels. The term "preferentially" as used herein means that within any outlet channel, the non-filtration walls have relatively more washcoat (on average), and thus relatively more SCR catalyst, applied thereto as compared to the filtration walls. The relative reduction of SCR catalyst-laden washcoat in the filtration walls can reduce a pressure drop through the filtration walls and the preferential location of the SCR catalyst on non-filtration walls within the outlet channels may improve passive regeneration capability of soot while also increasing catalytic efficiency for Nox. Numerous other embodiments are provided.

Figure 10:
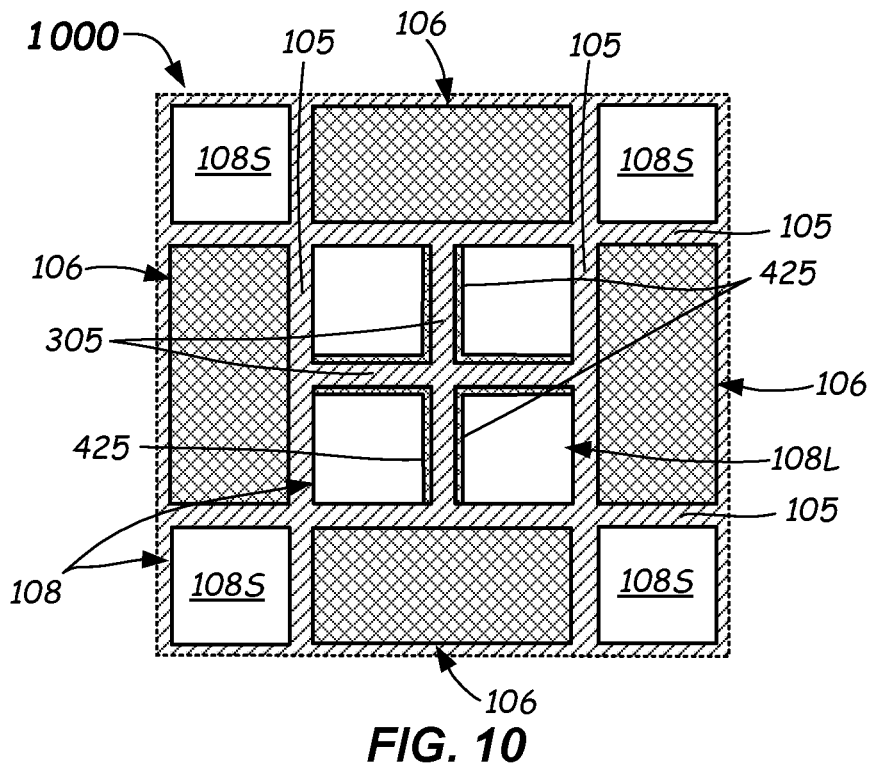

In accordance with some embodiments, the coated ceramic honeycomb body can comprise inlet channels and outlet channels, which are similarly sized and shaped, wherein there are more outlet channels than inlet channels. For example, the walls may define a square-shaped pattern extending across a cross-section of both the inlet channels and the outlet channels. Alternatively, the inlet channels may be shaped differently than the outlet channels. In some embodiments, the walls may define a square-shaped pattern extending across a cross-section of the outlet channels and a square-shaped pattern extending across a cross-section of the inlet channels (FIGS. 2-3, 4B-4C, 8, 11, 13, 18-21, and 23-25), wherein the total surface area of the outlet channels is greater than the total surface area of the inlet channels. As another example, the walls may define a rectangular-shaped pattern extending across a cross-section of the inlet channels and a square-shaped pattern extending across a cross-section of the outlet channels (FIG. 10). As yet another example, the walls may define a triangular-shaped pattern extending across a cross-section of the inlet channels and a cross-section of the outlet channels (FIG. 16), wherein the outlet channels are subdivided by non-filtration walls to provide greater surface area than inlet channels. Other variations are described herein. These various configurations of walls across the inlet and outlet channels may provide for increased isostatic strength and allow for preferential loading of washcoat on non-filtration walls.

Figure 8:
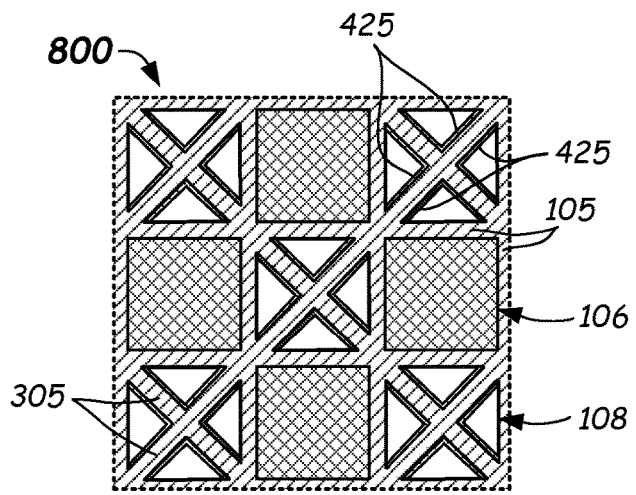
FIGS. 8-26 schematically illustrate enlarged plan views showing a portion of an outlet end face of a repeatable unit cell in other embodiments of the honeycomb body.

In accordance with other embodiments, the coated-ceramic honeycomb body can comprise non-filtration walls within the outlet channels that are arranged in various different configurations. For example, the non-filtration walls may connect to opposing corners of the filtration walls defining portions of the outlet channels, such as in an x-shaped configuration (FIGS. 8 and 9B). In another example, the non-filtration walls can connect across different opposing midpoints of at least some of the filtration walls defining at least some of the outlet channels in a cross-shaped or Y- or T-shaped configuration (FIGS. 3, 4B, 9A, 10, 16, 20, 22). In yet another example, the non-filtration walls can connect across different opposing midpoints of the filtration walls or non-filtration walls defining at least some of the outlet channels (FIGS. 9A, 13-15, 26). The presence of non-filtration walls within the outlet channels in various configurations may provide for a further increase in isostatic strength as well as more area for application of catalyst-containing washcoat (e.g., SCR catalyst-containing washcoat). Numerous other embodiments are provided.

FIG. 1 is a perspective view of a ceramic honeycomb body comprising plugs according to one embodiment. The ceramic honeycomb body 100 includes an inlet face 102 (FIG. 2) and an outlet face 104 (FIG. 3). The honeycomb structure of the ceramic honeycomb body 100 comprises a plurality of parallel inlet channels 106 and outlet channels 108 defined by porous filtration walls 105. A skin 103 may be formed at the periphery of the filtration walls 105 and the body 100. Skin can be extruded or after-applied (applied after firing). The outlet channels 108 can be plugged with plugs 107 in a checkerboard pattern at the inlet face 102 (FIG. 2) of the honeycomb body 100 in some embodiments. Similarly, the inlet channels 106 can be plugged with plugs 307 in a checkerboard pattern at the outlet face 104 of the honeycomb body 100.

Figure 2:
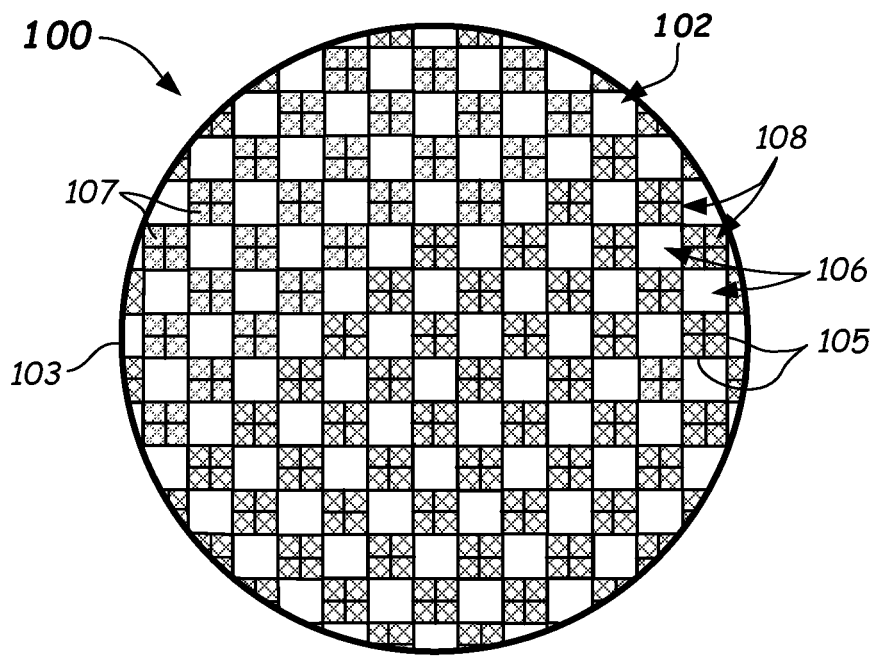
FIG. 2 schematically illustrates a plan view showing an inlet end face of the ceramic honeycomb body shown in FIG. 1.
Figure 3:
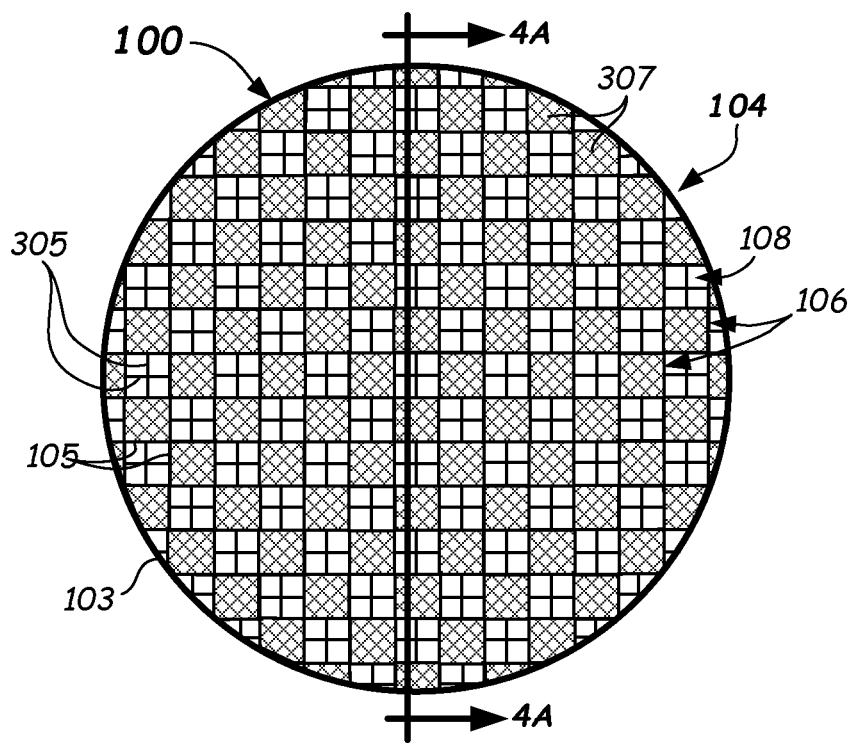
FIG. 3 schematically illustrates a plan view showing an outlet end face of the ceramic honeycomb body shown in FIG. 1.

FIG. 2 is an end plan view schematically showing an inlet face 102 of the coated ceramic honeycomb body 100 shown in FIG. 1. As discussed above, the outlet channels 108 are plugged on the inlet face 102 of the honeycomb body 100. As a result, in use, a particulate-laden flow can enter the honeycomb body 100 through the inlet channels 106, which are open on the inlet face 102 of the honeycomb filter 100. The inlet channels 106 and the outlet channel 108 are separated by porous filtration walls 105.

FIG. 3 is an end plan view schematically showing an outlet face 104 of the coated ceramic honeycomb body 100 shown in FIG. 1. As discussed above, the inlet channels 108 are plugged with plugs 307 on the outlet face 104 of the honeycomb body 100. As a result, a gas flow that enters the honeycomb body 100 through inlet channels 106 on the inlet face 102 passes through the filtration walls 105 and into outlet channels 108 and exits at the outlet face 104 of the coated ceramic honeycomb body 100. As the particulate-laden gas flow passes through the filtration walls 105, particles are trapped on or within the filtration walls 105 and can be removed from the gas flow at relatively high filtration efficiency (e.g., >99%).

In FIG. 2, the filtration walls 105 are shown as defining a square-shaped pattern extending across a cross-section of the inlet channels 106 and defining a square-shaped pattern across a cross-section of the outlet channels 108. Additional configurations of the filtration wall 105 may be implemented across the inlet channels 106 and the outlet channels 108, such as those shown herein. Optionally, the filtration walls 105 can be arranged to provide inlet channels and outlet channels of other polygonal shapes in transverse cross-section.

The outlet channels 108 at least partially defined by the filtration walls 105 may include non-filtration walls 305 which, in the depicted embodiment, separate and subdivide output channels 108 into subchannels. The non-filtration walls 305 increase a total surface area of the outlet channels 108 such that the total surface area of the outlet channels 108 is greater than the total surface area of the inlet channels 106 for the coated ceramic honeycomb body 100.

In some embodiments, the total surface area of the outlet channels to the total surface area of the inlet channels 106 can range from 1.2 to 4.0. In further embodiments, the total surface area of the outlet channels 108 is two or more times greater than the total surface area of the inlet channels 106. Moreover, in some embodiments, the total surface area of the outlet channels 108 to the total surface area of the inlet channels 106 can range from 2.0 to 3.0.

A catalytic material, or catalyst, such as an SCR catalyst may be applied preferentially to the non-filtration walls 305 thereby helping to reduce the pressure drop across the filtration walls 105, by minimizing the washcoat loading (and catalyst loading—e.g., SCR catalyst loading) on the filtration walls 105. The catalyst may be applied as a component of a washcoat 425 across the surfaces of the non-filtration walls 305 or may be deposited within the pores of the non-filtration walls 305, or both.

In FIG. 3, the non-filtration walls 305 are shown as connecting across different opposing midpoints of the filtration walls 105 defining non-filtration walls 305 in the outlet channels 108 in a cross-shaped configuration in the depicted orientation. Additional non-filtration wall 305 configurations may be implemented within the outlet channels 108 as are shown and contemplated herein.

Figure 4A:
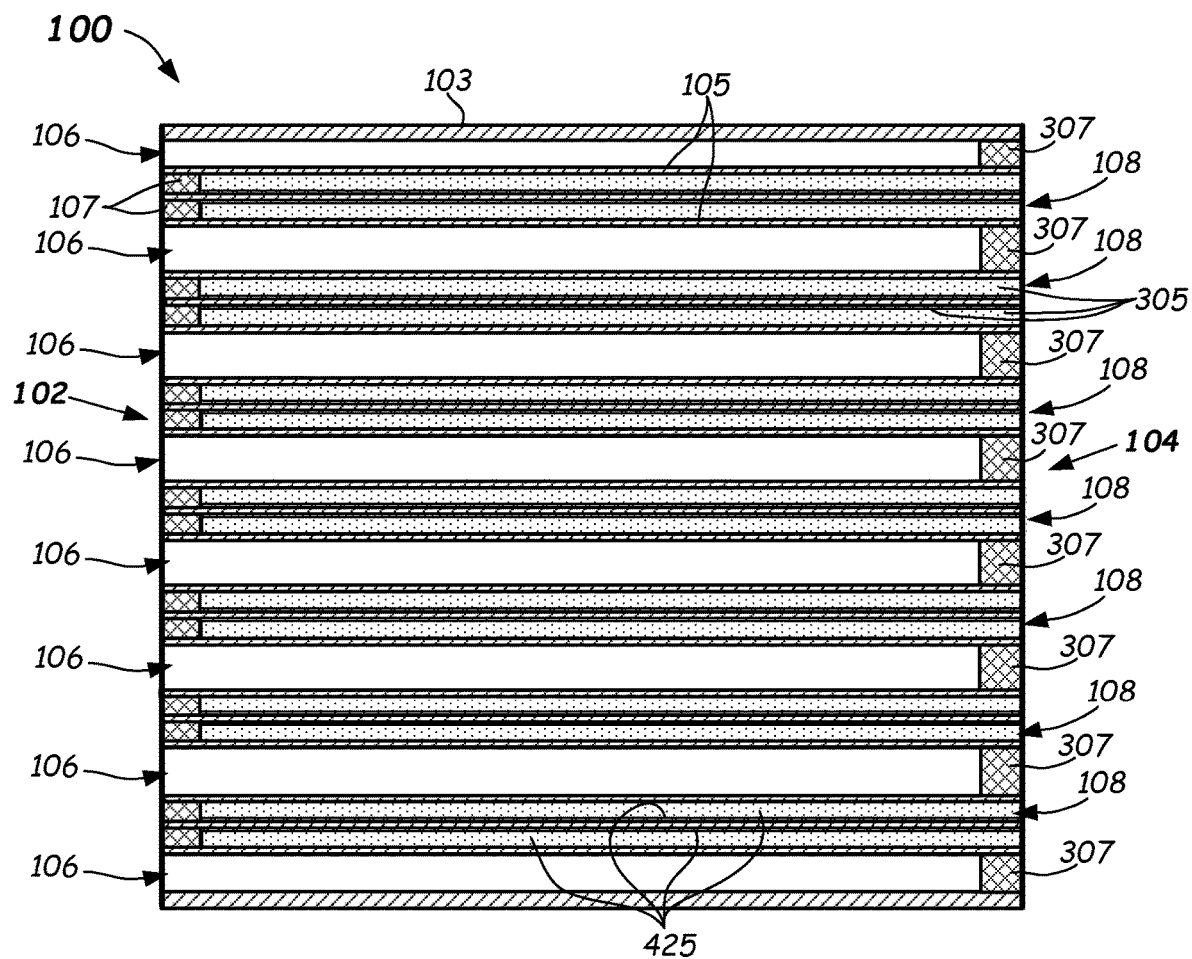
FIG. 4A schematically illustrates a cross-sectional side view showing a cross-section taken along section line 4A-4A of FIG. 3.

FIG. 4A is cross-sectional side view schematically showing a cross-section taken along section line 4A-4A of FIG. 3. The inlet face 102 includes a plug 107 at each of the outlet channels 108 in the embodiment shown. Similarly, the outlet face 104 includes a plug 307 at each of the inlet channels 106. The inlet channels 106 and the outlet channels 108 are separated by porous filtration walls 105. The filtration walls 105 filter particles in a particulate-laden flow as it passes from an inlet channel 106 to an outlet channel 108. Once the flow has passed through the filtration walls 105, leaving behind a large percentage of the soot and other particles, and has entered the outlet channels 108, the flow then interacts via a catalyzing reaction with the catalyst-containing washcoat 425 (e.g., a SCR catalyst-containing washcoat) preferentially coated in the outlet channels 108 and preferentially loaded on the non-filtration walls 305. The phrase "preferentially loaded on the non-filtration walls" as used herein means loaded on an outside surface of the non-filtration wall 305 or on surfaces of pores within the non-filtration wall 305, or both. The phrase "preferentially loaded" further means that the catalyst-containing washcoat 425 has more washcoat loading, by weight, carried by the non-filtration walls 305 than by the filtration walls 105. Notably, some smaller amount catalyst-containing washcoat 425 may still remain carried by the filtration walls 105, but to a lesser extent by weight on average than on the non-filtration walls 305. Thus, backpressure through the filtration walls can be lowered or the wall thickness can be increased for strength at the same backpressure.

Figure 4B:
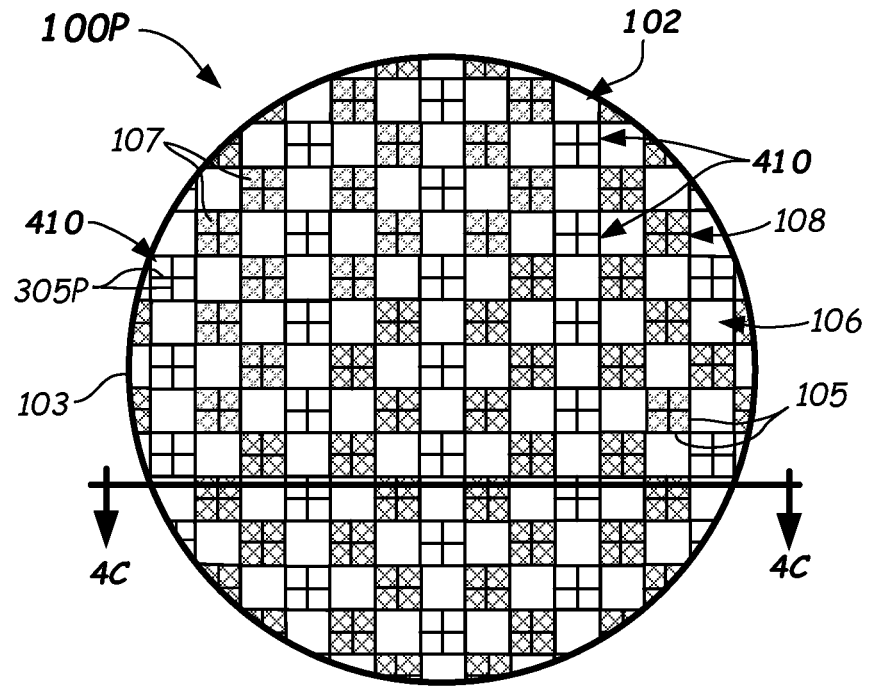
FIG. 4B schematically illustrates a plan view showing an inlet end face of the ceramic honeycomb body wherein some channels are unplugged pass-through channels according to one or more embodiments of the disclosure.
Figure 4C:
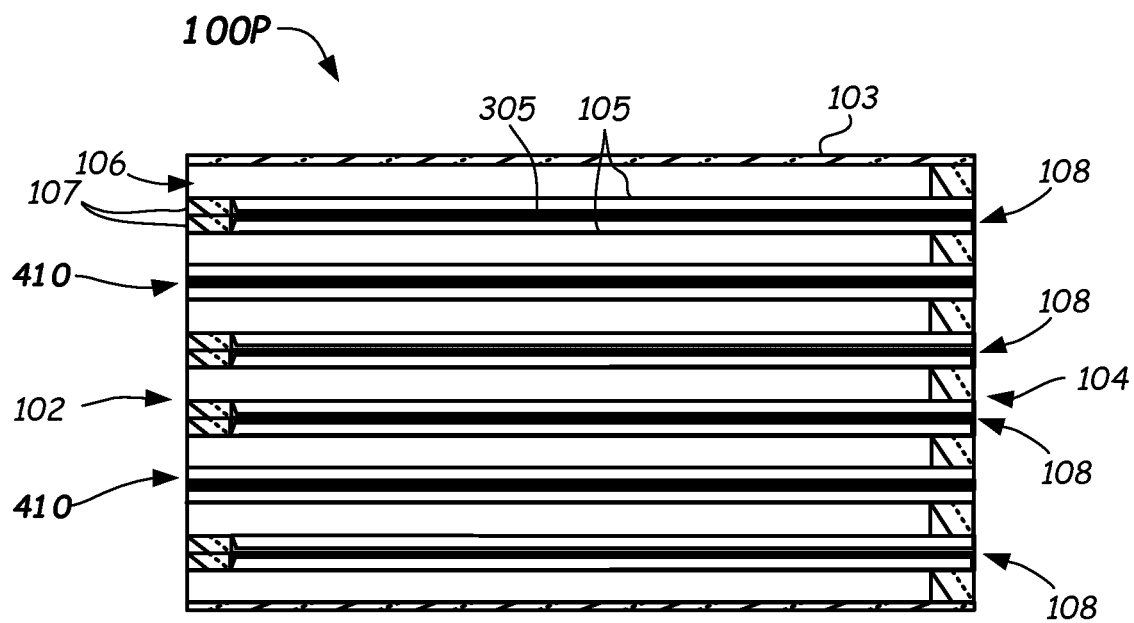
FIG. 4C schematically illustrates a cross-sectional side view showing a cross-section taken along section line 4C-4C of FIG. 4B.

FIGS. 4B and 4C schematically illustrates another embodiment of a coated honeycomb body 100P. The coated honeycomb body 100P comprises a honeycomb structure comprising a matrix of intersecting porous walls forming a plurality of axially-extending channel. At least some of the plurality of axially-extending channels being plugged on an outlet end 104 to form inlet channels 106 and plugged on an inlet end 102 to form outlet channels 108, wherein at least some of the porous walls of the outlet channels 108 comprise filtration walls 105 and some comprise non-filtration walls 305. Further, at least some of the channels comprise unplugged pass-through channels 410. The pass-through channels 410 are not plugged at either the inlet end 102 or the outlet end 104 or in between, and provide a path for the effluent material (e.g., exhaust gas) to pass directly through the coated honeycomb body 100P. The pass-through channels 410 can further include therein non-filtration walls 305P. Because of the presence of pass-through channels 410, the backpressure across the coated honeycomb body 100P can be very low. The backpressure can be controlled by adjusting the number of pass-through channels 410. However, as more pass-through channels 410 are provided, the filtration efficiency is degraded. This type of coated honeycomb body 100P can be used in conjunction with another coated honeycomb body 100P or any of the other coated honeycomb bodies described herein or with a conventional filter located downstream to provide stratified soot collection.

A catalyst-containing washcoat 425 (e.g., selective catalyst reduction catalyst or other catalyst) is preferentially located within the outlet channels 108 and is preferentially loaded on the non-filtration walls 305 thereof. The catalyst-containing washcoat 425 (e.g., selective catalyst reduction catalyst or other catalyst) can also be located within the pass-through channels 410, such as on the non-filtration walls 305P thereof. An adhered mask may be used to plug the pass-through channels 410 at the inlet end 102 during initial washcoating and then removed.

The percentage of pass-through channels 410 as compared to the total number of channels can range from 2% to 33%, for example, with 20% being illustrated in FIGS. 4B and 4C. Other percentages are possible. The number of pass-through channels 410 can be selected to control the backpressure and filtration efficiency. In some embodiments, a total surface area of the outlet channels 108 is greater than a total surface area of the inlet channels 106.

Figure 5:
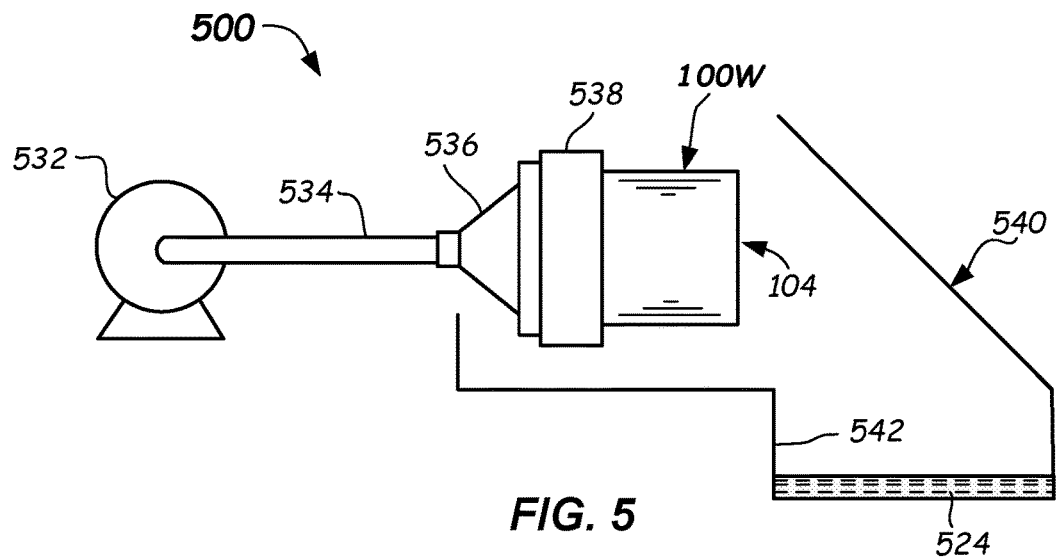
FIG. 5 schematically illustrates a side plan view of a slurry coating apparatus configured to remove at least some of a catalyst-containing slurry from filtration walls and preferentially coat non-filtration walls within a honeycomb body according to one or more embodiments.

FIG. 5 schematically illustrates a schematic side view of a slurry coating apparatus 500 operatively used to remove a catalyst-containing coating (e.g., a catalyst-containing slurry 524) from filtration walls 105 within a ceramic honeycomb body 100 according to one embodiment. The slurry coating apparatus 500 can include a pump 532, a conduit 534, a collar 538, and a catch basin 540. The slurry coating apparatus 500 can also include an expander 536. Expander 536, can include a shallow internal cone angle (e.g., <15 degrees). The pump 532 provides a gas flow (e.g., air flow) that is routed to the expander 536 via the conduit 534. Any suitable pump that can provides and air source and air flow can be used, such as a positive displacement air pump (e.g., piston pump, diaphragm pump, gear or vane pump, or the like). The collar 538 attaches to and provides a substantially-airtight seal around the skin 103 of the wet-coated honeycomb body 100W, whose outlet channels 108 have previously been subjected to the slurry 524 containing a catalyst (e.g., SCR catalyst-containing slurry). The surface of the collar 538 can be provided in sealing contact with the expander 536, such that gas flow from the pump 532 can pass through the conduit 534, and through expander 536, while expanding the gas flow to coincide substantially with the exposed frontal area of inlet face 102 of the wet coated honeycomb body 100W. The gas flow then continues through the inlet channels 106, through the filtration walls 105 of the wet-coated honeycomb body 100W and into the outlet channels 108. In some embodiments, some of the slurry 524 can exit from the outlet channels 108 and exit into a region near the catch basin 540. The catch basin 540 can be positioned proximate to the outlet face 104 of the wet-coated honeycomb body 100W. The catch basin 540 is configured to capture slurry 524 expelled from the filtration walls 105 that has been pushed out through the outlet channels 108 of the wet-coated honeycomb body 100W with the gas stream. Any excess slurry 524 can be caught and collected in a reservoir 542 of, or coupled to, the catch basin 540 for reuse in the slurry coating process. Because there is little or no pressure differential across the non-filtration walls 305, less catalyst-containing slurry 524 is removed therefrom by the gas flow, thus resulting in the preferential slurry loading (higher average weight loading) on the non-filtration walls 305 than the filtration walls 105. Contrarily, because there is a pressure drop cross the filtration walls 105, at least some of the slurry 524 is removed therefrom by the gas flow. In some embodiments, the gas flow may distribute the slurry axially along the filter length such that no slurry 524 is able to flow out of the wet-coated honeycomb body 100W during this step because it is all taken up by and distributed along the non-filtration walls 305.

The slurry 524 can be applied to the honeycomb body 100 to form the wet-coated honeycomb body 100W by any suitable method. The application can be by filling the outlet channels 108 with the slurry 524, while not filling the inlet channels 105 with the slurry 524. The filling can be accomplished by immersing or otherwise exposing an outlet end 104 to a source of slurry 524 and then drawing the slurry 524 into the outlet channels 108. This can be accomplished by applying a suitable vacuum to the inlet end 102 while the outlet end is immersed in a source of slurry 524. Optionally, once filled, gas pressure from a pump can be applied to the outlet end 104. As part of the coating process (via application of vacuum to inlet end 102 or pressure to the outlet end 104) some amount of the slurry 524 may be drawn or pushed into the porosity of the filtration walls 105. Likewise, as part of the filling process or drawing in process, non-filtration walls 305 may be coated and some portion of the slurry 524 may be drawn into the non-filtration walls 305 by at least capillary action. In some embodiments, the wet-coated honeycomb body 100W may be subjected to the slurry 524 before being mounted in the collar 538 of FIG. 5, or optionally can be inserted into the slurry removal apparatus of FIG. 6B and then filled as shown and described with reference to FIG. 6B.

In the embodiment of FIG. 5, following the filling operation and after some amount of the slurry 524 has been provided in the filtration walls 105, the inlet end 102 can be exposed to a gas flow sufficient to blow at least some of the slurry 524 from the filtration walls 105 and possibly remove some of the slurry 524 from the passages of the outlet channels 108, and because of the lack of pressure differential across the non-filtration walls 315, the slurry 524 can remain in the porosity thereof and upon the surfaces of non-filtration walls 305. Following coating with slurry 524 and clearing slurry from the filtration walls 105, the coated honeycomb body can be dried and calcined.

In some embodiments the relative washcoat loading (defining an extent of preferential washcoat loading after calcining) as between the filtration walls 105 and the non-filtration walls 305 can be expressed by Eqn. 1 as a coating ratio (CR):

$$CR = WLf/WLnf \qquad \text{Eq. 1}$$

wherein

WLf is an average washcoat loading, by weight, on and within the filtration walls 105 in gm/L, and WLnf is an average washcoat loading, by weight, on and within the non-filtration walls 305 in gm/L.

According to embodiments, CR can be CR≤0.8, or CR can range from 0.2 to 0.8, for example. If CR is greater than 0.8 then there is too much washcoat in the pores of the filtration walls 105, thus increasing backpressure, etc. Total elimination of washcoat from the pore structure of the filtration walls 105 is desirable, but difficult in practicality.

Figure 6A:
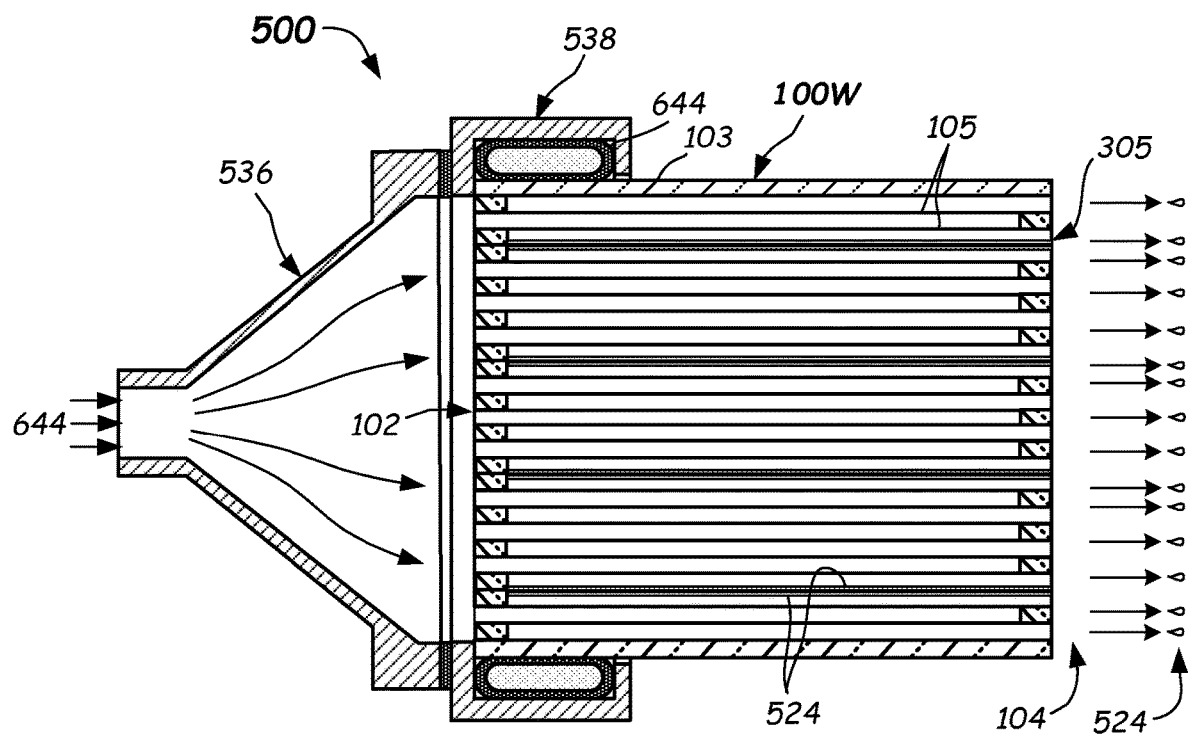
FIG. 6A schematically illustrates a cross-sectioned side view of a honeycomb body disposed in a slurry coating apparatus showing the removal a catalyst-containing slurry from filtration walls and preferentially coating the non-filtration walls of the honeycomb body according to one or more embodiments.
Figures 6B, 7A:
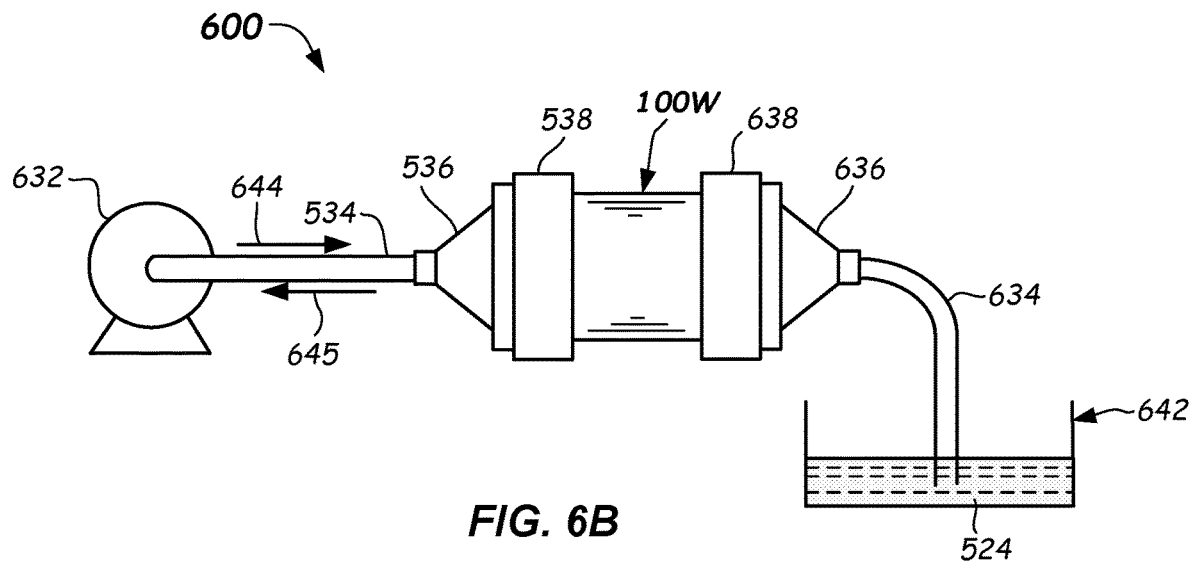
FIG. 6B schematically illustrates a side plan view of an alternative embodiment of a slurry coating apparatus configured to remove a catalyst-containing slurry from filtration walls within a honeycomb body according to one or more embodiments.
FIG. 7A illustrates a flowchart of a first method of manufacturing a coated ceramic honeycomb body according to one or more embodiments.
Figure 7B:
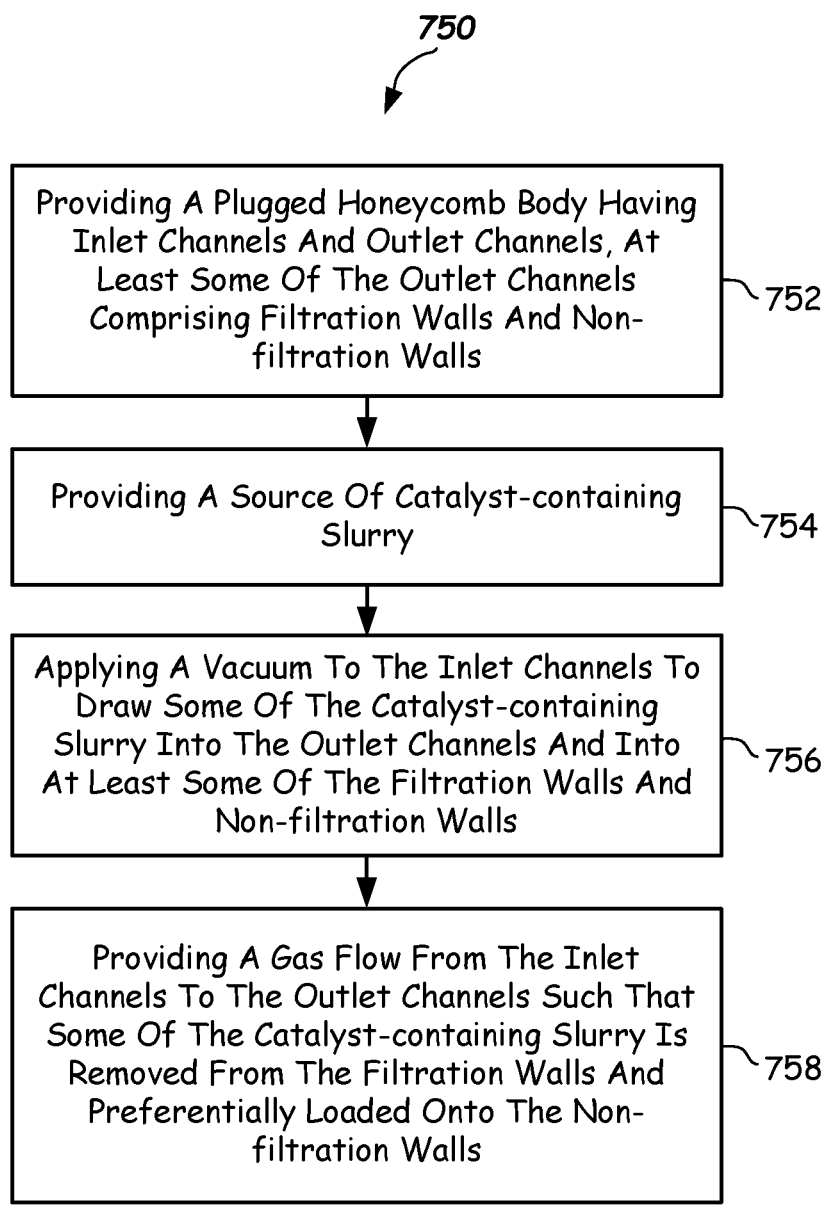
FIG. 7B illustrates a flowchart of a second method of manufacturing a coated ceramic honeycomb body according to one or more embodiments.

FIG. 6B schematically illustrates a side plan view of an alternative embodiment of a slurry coating apparatus 600 operatively used to coat and then remove a catalyst-containing slurry (e.g., SCR catalyst-containing slurry 524) from filtration walls 105 within a ceramic honeycomb body 100 according to one embodiment, yet preferentially coat the non-filtration walls 305 of the outlet channels 108. The slurry coating apparatus 600 can comprise a reversible pump 632, conduits 534, 634, collars 538, 638, and a reservoir 642.

The reversible pump 632 can provide a reversible gas flow (e.g., air flow) that is routed to and from the collar 538 via the conduit 534. Expanders 536, 636 that can include a shallow internal cone angle (e.g., <15 degrees) may be included to enable appreciable gas flow over all the inlet channels 106 of the inlet face 102 of the honeycomb body. The collars 538, 638 can attach to and provide a substantially airtight seal around the skin 103 of the honeycomb body. Operation of the pump 632 in a first flow direction 645 creates a vacuum that draws slurry 524 from the reservoir 642 through the conduit 634 and into the outlet channels 108 containing the non-filtration walls 305 of the honeycomb body and also draws at least some slurry 524 into at least a part of the filtration walls 105 to form the wet-coated honeycomb body 100W. The draw of slurry 524 can continue until a certain pressure or other predetermined condition (e.g., a predetermined time) indicative of drawing in a suitable amount of slurry 524 into the open and interconnected porosity of the filtration walls 105 is reached.

After that, the reversible pump 632 can be reversed in direction to cause a gas flow in the opposite second direction 644. The second gas flow in the second direction 644 causes at least some of the slurry 524 to be blown from and removed from the filtration walls 105 and from the outlet channels 108, yet leaving behind and possibly further distributing a suitable disposition of the slurry 524 on the surface of and in the open, interconnected porosity of the non-filtration walls 305.

As discussed above, the average slurry loading (by weight) that remains disposed in and on the non-filtration walls 305 is greater than the average slurry loading (by weight) disposed in and on the filtration walls 105. Thus, the above method of manufacturing a coated honeycomb body can produce a wash-coated honeycomb body having non-filtration walls 305 that are preferentially loaded with a greater loading weight, on average, of catalyst-containing washcoat (e.g., SCR catalyst-containing washcoat) as compared to the loading weight, on average, of filtration walls 105.

FIG. 6A is a side cross-sectional view of a portion of the slurry coating apparatus 500 showing the removal of a portion of a catalyst-containing slurry 524 from filtration walls 105 of the wet-coated honeycomb body 100W according to one embodiment. The collar 538 creates the substantially-airtight seal using an expandable bladder 644 that is inflated and rests against skin 103 near the edges of the inlet face 102 of the wet-coated honeycomb body 100W. As the gas flow 644 is pumped by pump 532 through the filtration walls 105 of the wet-coated honeycomb body 100W, some portion of the slurry 524 applied to the outlet channels 108 is removed from the filtration walls 105 and either deposited and distributed onto the non-filtration walls 305 or is pushed out of the wet-coated honeycomb body 100W through the outlet face 104. If any is pushed out, is can be directed into the reservoir 542 of the catch basin 540. The embodiment of FIG. 6B would operate in a similar manner, except that the blown off slurry 524 would be captured by expander 636 and directed back to the reservoir 642 by conduit 634.

FIG. 7A illustrates a flowchart of a first method of manufacturing a coated honeycomb body 100 according to one or more embodiments. The method 700A comprises, in 702, providing a plugged honeycomb body (e.g., a plugged ceramic honeycomb body) having inlet channels 106 and outlet channels 108, wherein at least some of the outlet channels 108 comprise filtration walls 105 and non-filtration walls 305.

The method 700A further comprises, in 704, subjecting the outlet channels (e.g., outlet channels 108) and the non-filtration walls 305 to a catalyst-containing slurry (e.g., a slurry 524 such as a SCR catalyst-containing slurry). This forms the wet-coated honeycomb body 100W. The outlet channels 108 may be subjected to the catalyst-containing slurry (e.g., catalyst-containing slurry 524) using any known coating method such as masking and dipping or sealing and filling or drawing or pushing in the catalyst-containing slurry 524 through the use of a vacuum applied to the inlet end 102 or pressure applied to the outlet end 104, such as by pushing slurry 524 in from a piston-cylinder apparatus. In some embodiments, the inlet end 102 and inlet channels 106 can be sealed and/or otherwise protected from exposure to the catalyst-containing slurry 524 along with the skin 103 while coating.

The catalyst-containing washcoat 524 may be made from alumina or other suitable inorganic particulates disbursed in a liquid (e.g., water) along with a suitable catalyst for the desired reaction. The catalyst can be an SCR catalyst that can "selectively" convert NOx into nitrogen and water, thereby substantially reducing NOx emissions (e.g., by up to 97%), for example. For SOx removal, the catalyst used can be a platinum group metal component that is selected from the group consisting of palladium, rhodium, ruthenium, iridium, and combinations thereof, for example. Other materials such as oxides and aluminum oxides of lithium, magnesium, calcium, manganese, iron, cobalt, nickel, copper, zinc, and silver can be included as part of the catalyst-containing slurry 524. In some embodiments, the catalyst can be a $SO_x$ sorbent component selected from the group consisting of MgO, MgA O MnO, $MnO_2$, and $O_2O$, for example. The washcoat loading of washcoat after calcining, when an SCR catalyst, can be from 20 gm/L to about 200 gm/L on the non-filtration walls 305. Depending on the type of catalyst, other washcoat loadings can be used. The proper washcoat loading, by weight, can be determined by testing of the washcoat on the particular design and size of the coated honeycomb body 100-2600 while be subjected to expected amounts of effluent to be abated.

The method 700A further includes, in 706, providing a gas flow (e.g., air flow) from the inlet channels 106 to the outlet channels 108 such that at least some of the catalyst-containing slurry 524 on the filtration walls 105 is removed providing a catalyst-containing slurry 524 preferentially loaded on the non-filtration walls 305. Specifically, a fixture of FIG. 6A or 6B can be attached to the wet-coated honeycomb body 100W, which is used to couple a gas flow from the pump 532, 632 or other gas source through the wet-coated honeycomb body 100W to remove a portion of the slurry 524 from the filtration walls 105 with minimal removal of slurry 524 from the non-filtration walls 305. Thus, the slurry 524 becomes preferentially loaded on the non-filtration walls 305.

In a first method embodiment, the fixture for sealing (e.g., collar 538 and expander 536) of FIG. 5 is attached to the inlet end face 104 so that pressure from the pump 532 can be used to push the slurry 524 into a portion of the outlet channels 108 from the inlet face 104 while distributing onto the non-filtration walls 305 or pushing any excess out of the outlet channels 108.

In a second method embodiment, a fixture for sealing (substantially similar to the fixture shown in FIG. 5) can be attached to the outlet end face 104 so that a low-level vacuum, such as from a piston pump, can be used to pull the slurry 524 from the filtration walls 105 and into the outlet channels 108 from the outlet face 104 and thus resulting in preferentially coating the non-filtration walls 305 as there is no differential pressure mechanism to remove the slurry 524 therefrom.

In another method embodiment, a fixture for sealing (substantially similar to the fixture shown in FIG. 6B) can be attached to both the inlet end face 102 and the outlet end face 104. After applying a low-level vacuum via the pump 632 to pull the slurry 524 from the reservoir 642 into the outlet channels 108 and into at least a portion of the filtration walls 105, the flow can be reversed. The reversed flow pushes at least some of the slurry 524 from the filtration walls 105 and into the outlet channels 108 thus resulting in preferentially coating the non-filtration walls 305 as there is no differential pressure mechanism to remove the slurry 524 from the non-filtration walls 305.

In each of the methods outlined above, the inlet channels 106 are substantially devoid of slurry 524 and thus substantially devoid of the catalyst-containing washcoat after calcining, and thus are devoid of catalyst. Further, the filtration walls 105 include a reduced amount of the washcoat, thus backpressure can be substantially reduced. The pressure and low-level vacuum used in each case will depend on the size of the honeycomb body 100W as well as the thickness and porosity of the filtration walls 105. As an example, the pressure for the first embodiment can comprise a range from 0.1 to 40 psi (0.7 KPa to 276 KPa), and the vacuum for the second embodiment can comprise a range from 0.1-15 kPa. Other pressure and vacuum levels can be used.

FIG. 8 is an enlarged plan view showing an enlarged unit cell extracted from an outlet end face in another embodiment of a coated ceramic honeycomb body 800. The unit cell configuration shown can be populated all over the outlet end face 104. In this embodiment, the filtration walls 105 form a pattern of equally-sized squares of inlet channels 106 and outlet channels 108. The non-filtration walls 305 connect across opposing corners of the filtration walls 105 defining an outlet channel 108 including an x-shaped configuration of non-filtration walls 305 therein. Other configurations of non-filtration walls 305 described herein can be used. No non-filtration walls are provided in the inlet channels 106. The washcoat 425 is preferentially located and applied to the non-filtration walls 305. A small amount of the washcoat 425 may remain in or on the filtration walls 105, but to a lesser average weight extent (loading) than on the non-filtration walls 305.

In this embodiment, there are the same numbers of outlet channels 108 as inlet channels 106. However, in this embodiment, due to the inclusion of the non-filtration walls 305, the total surface area of the outlet channels 108 is greater than a total surface area of the inlet channels 106, and wherein the catalyst is preferentially located within the outlet channels 108. In particular, the washcoat 425 is preferentially disposed on the non-filtration walls 305.

Figure 9A:
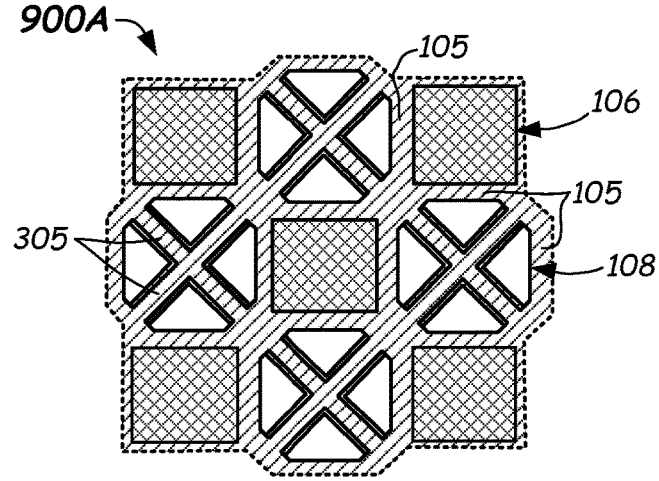
Figure 9B:
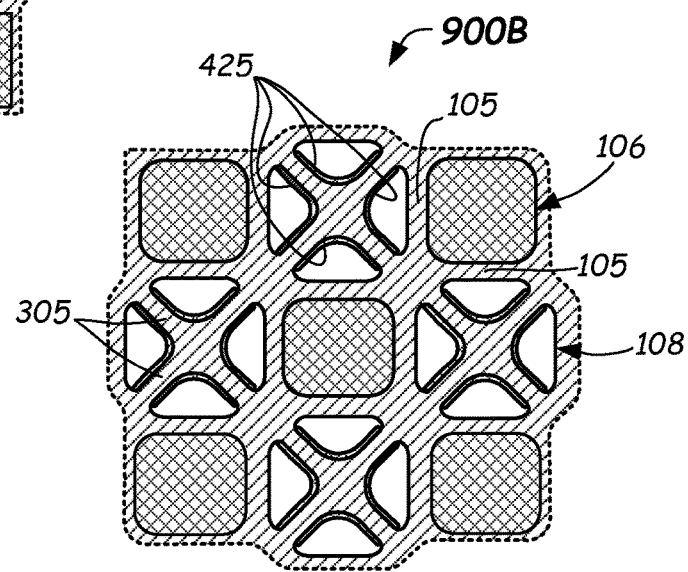

FIG. 9A is an enlarged plan view showing an enlarged unit cell extracted from an outlet end face of another embodiment of a coated ceramic honeycomb body 900A comprising an octagon-square configuration. This configuration of unit cell can be populated over the entire outlet end 104. On the inlet end 102, the inlet channels 106 are unplugged and the outlet channels 108 are plugged. The non-filtration walls 305 connect across opposing sides of the octagon in an x-shaped configuration. Non-filtration walls are not included in the inlet channels 106. Other non-filtration wall configurations described herein can alternatively be used. The washcoat 425 is preferentially disposed on non-filtration walls 305. In this embodiment, the outlet channels 108 are larger in cross-sectional area than the inlet channels 106. Further, the total surface area of the outlet channels 108 is greater than a total surface area of the inlet channels 106.

FIG. 9B is an enlarged plan view showing an enlarged portion extracted from an outlet end face of an alternate embodiment of a coated ceramic honeycomb body 900B comprising an square-square configuration including corner radiusing. The non-filtration walls 305 connect across opposing sides of the octagon in an x-shaped configuration. However, other non-filtration wall configurations described herein can be used. The washcoat 425 is preferentially disposed on the non-filtration walls 305. In this embodiment, the outlet channels 108 are larger in cross-sectional area than the inlet channels 106. Furthermore, the total surface area of the outlet channels 108 is greater than a total surface area of the inlet channels 106. In each of FIGS. 9A and 9B, the area ratio of a cross-sectional area of an inlet channel 106 to a cross-sectional area of an outlet channel 108 can be between 0.6 and 0.9, for example. Other area ratios can be used.

FIG. 10 is an enlarged plan view showing an enlarged unit cell extracted from an outlet end face of another embodiment of a coated honeycomb body 1000 according to one embodiment. In this embodiment, the outlet channels 108 are square and the inlet channels 106 are rectangles. The non-filtration walls 305 connect across opposing sides (e.g., midpoints) of the filtration walls 105 in a cross-shaped configuration. However, other filtration wall configurations described herein could be used. The washcoat 425 is preferentially applied to and disposed on the non-filtration walls 305. In this embodiment, there are more outlet channels 108 than inlet channels 106. The central outlet channel 108L of the unit cell including the non-filtration walls 305 is larger is cross-sectional area than the smaller outlet channels 108S in the corner of the unit cell that are devoid of non-filtration walls. The inlet channels 106 are also devoid of non-filtration walls. Thus, in this embodiment, some outlet channels 108 (e.g., the larger outlet channels 108L) include filtration walls 305 and others do not. Further, the total surface area of the outlet channels 108 is greater than a total surface area of the inlet channels 106.

Figure 11:
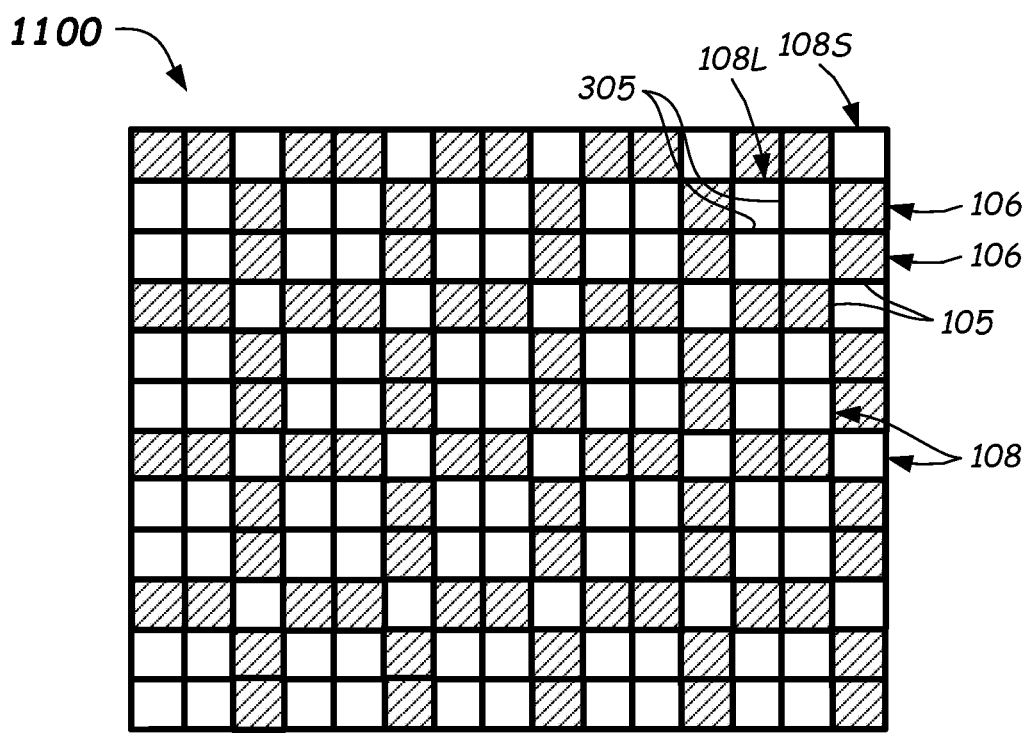

FIG. 11 is an enlarged plan view showing an enlarged portion extracted from an outlet end face of another embodiment of the coated ceramic honeycomb body 1100. In this embodiment, the outlet channels 108 are shown as white squares and the inlet channels 106 are shown as hatched squares. The non-filtration walls 305 connect to corners of the filtration walls 105 and are arranged in a cross-shaped configuration. The washcoat 425 is preferentially located and disposed on the non-filtration walls 305. Further, FIG. 11 illustrates that some of the porous walls are filtration walls 105 that separate inlet channels 106 from outlet channels 108 and some of the porous walls are non-filtration walls 305 that separate and subdivide adjacent outlet channels 108. This embodiment comprises smaller inlet channels 106 and a combination of some larger outlet channels 108L and some smaller outlet channels 108S, wherein the smaller square-shaped inlet channels 106 being smaller is cross-sectional area than the larger square-shaped outlet channels. Thus, in this embodiment, some of the outlet channels 108L are larger in cross-sectional area than at least some of the inlet channels 106 and the larger outlet channels 108L include non-filtration walls that further include a higher average loading, by weight, of catalyst-containing washcoat 425 (preferentially located coating) than do the filtration walls 105.

Thus, in the embodiment of FIG. 11, a honeycomb structure 1100 comprising a matrix of intersecting porous walls forming a plurality of axially-extending channels is provided. At least some of the plurality of axially-extending channels being plugged on an outlet end 104 to form inlet channels 106 and plugged on an inlet end 102 to form outlet channels 108, and wherein some of the outlet channels 108L are larger in cross-sectional area than at least some of the inlet channels 106. Further, the larger outlet channels 108L comprise non-filtration walls 305, and a catalyst-containing washcoat 425 is preferentially disposed on the non-filtration walls 305. "Preferentially disposed" as used herein means in or on the respective wall.

Figure 12:
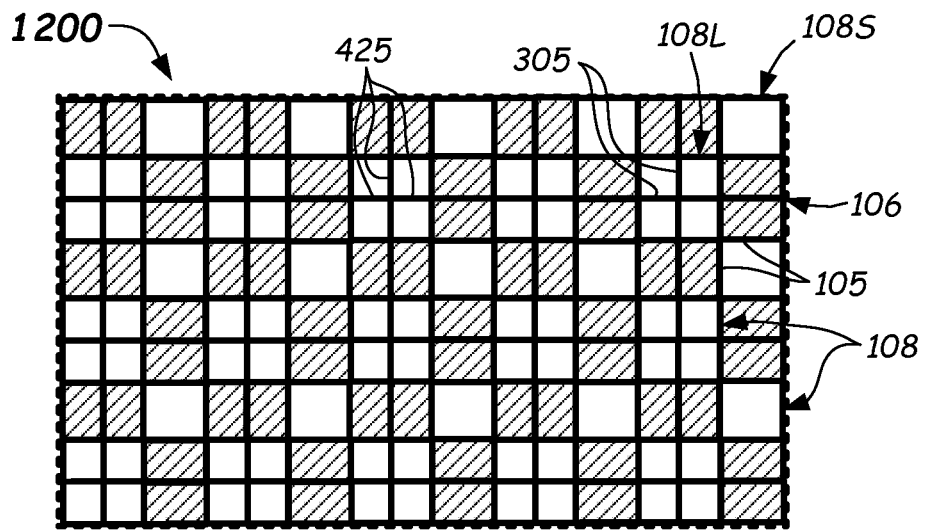

FIG. 12 is an enlarged plan view showing an enlarged portion extracted from an outlet end face in another embodiment of the coated ceramic honeycomb body 1200. In this embodiment, the outlet channels 108 are shown as white squares and the inlet channels 106 are shown as hatched rectangles. The non-filtration walls 305 connect to corners of the filtration walls 105 and are arranged in a cross-shaped configuration as shown. The washcoat 425 is preferentially applied to and disposed on the non-filtration walls 305.

Thus, in the embodiment of FIG. 12, a honeycomb structure 1200 comprising a matrix of intersecting porous walls forming a plurality of axially-extending channels is provided. At least some of the plurality of axially-extending channels comprise inlet channels 106 and outlet channels 108 as before. As in FIG. 11, some of the outlet channels 108L are larger in cross-sectional area than at least some of the inlet channels 106. Further, the larger outlet channels 108L include non-filtration walls 305, and a catalyst-containing washcoat 425 is preferentially disposed on the non-filtration walls 305. In this embodiments, the inlet channels 106 are rectangular (non-square), and the outlet channels 108 comprise squares and combinations of larger outlet channels 108L and smaller outlet channels 108S, wherein the smaller outlet channels 108S are devoid of non-filtration walls and the larger outlet channels 108L include non-filtration walls 305.

Figure 13:
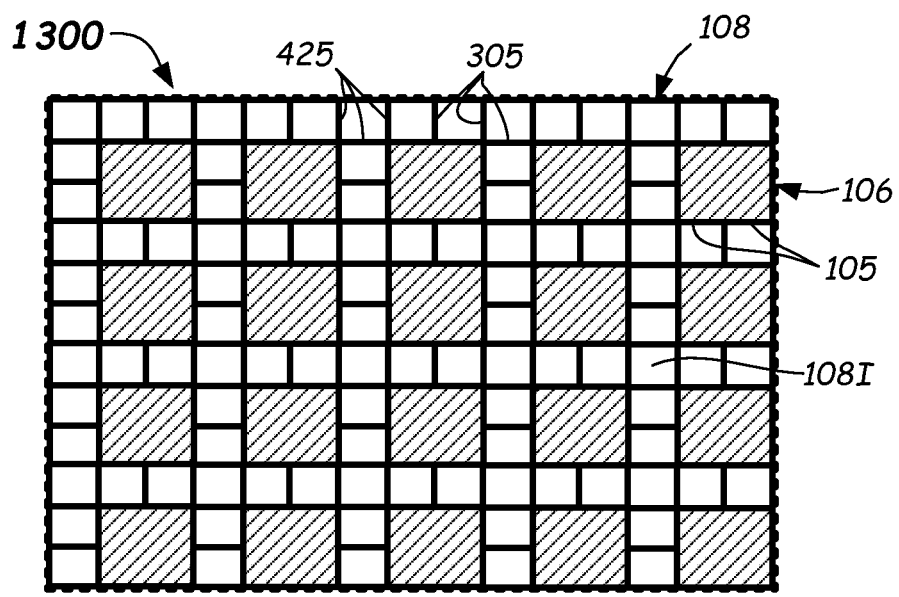

FIG. 13 is an enlarged plan view showing an enlarged portion extracted from an outlet end face in another embodiment of the coated ceramic honeycomb body 1300. In this embodiment, the outlet channels 108 are shown as smaller white squares and the inlet channels 106 are shown as larger hatched squares. Some of the non-filtration walls 305 connect to corners and others connected between midpoints of the filtration walls 105. The washcoat 425 is preferentially applied to and disposed on the non-filtration walls 305. In this embodiment, the number of outlet channels 108 is greater than a number of inlet channels 106 (8 outlets:1 inlet). Further, the inlet channels 106 include a larger cross-sectional area (4:1) as compared to the outlet channels 108. For each outlet channel 108 shown that are not at the intersections of the rows and columns of outlet channels, two filtration walls 105 and two non-filtration walls 305 are provided. At the intersections of the rows and columns, the outlet channels 108I comprise four non-filtration walls.

Figure 14:
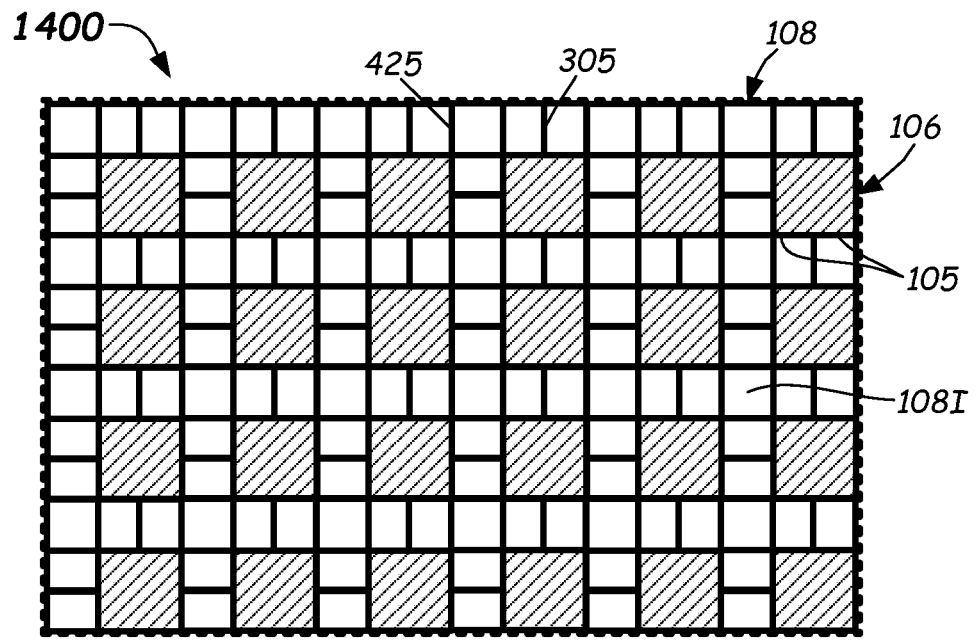

FIG. 14 is an enlarged plan view showing an enlarged portion of an outlet end face in another embodiment of the coated ceramic honeycomb body 1400. In this embodiment, the outlet channels 108 are shown as smaller white squares and the inlet channels 106 are shown as larger hatched squares. Some of the non-filtration walls 305 connect to corners and others connected between midpoints of the filtration walls 105. The washcoat 425 is preferentially applied to and disposed on the non-filtration walls 305. In this embodiment, the number of outlet channels 108 is greater than a number of inlet channels 106 (8 outlets:1 inlet). Further, each inlet channel 106 includes a larger cross-sectional area as compared to the cross-sectional area of each of the outlet channels 108. However, the total cross-sectional area of the inlet channels 106 is less than a total cross-sectional area of the outlet channels 108. For each outlet channel 108 shown that are not at the intersections of the rows and columns of outlet channels, two filtration walls 105 and two non-filtration walls 305 are provided. At the intersections of the rows and columns, the outlet channels 108I have four non-filtration walls. Outlets 108 comprise combinations of squares and rectangles.

Figure 15:
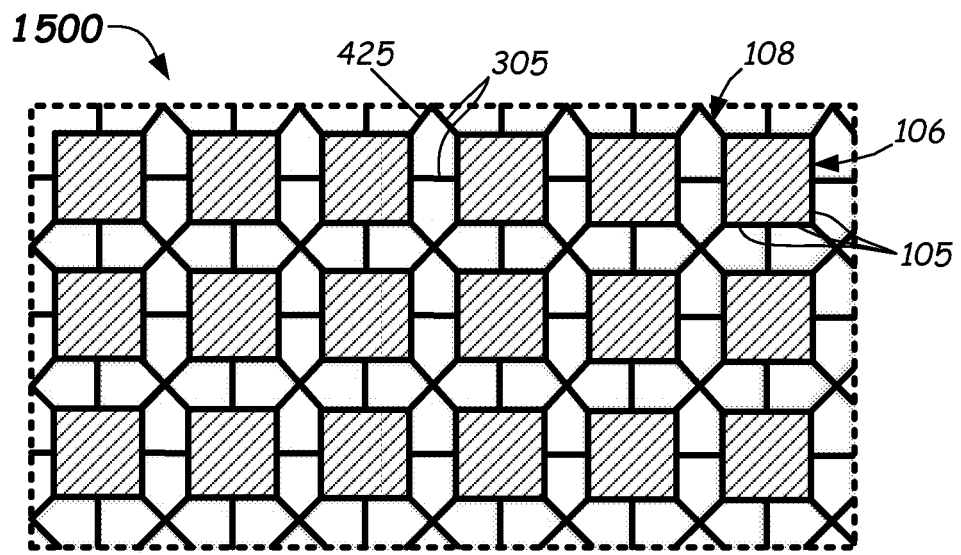

FIG. 15 illustrates an enlarged plan view showing an enlarged part of an outlet end face of another embodiment of the coated ceramic honeycomb body 1500. In this embodiment, the outlet channels 108 are shown in white and the inlet channels 106 are shown as hatched squares. Some of the non-filtration walls 305 connect to corners and others connect between midpoints of the filtration walls 105. In this embodiment, the number of outlet channels 108 is greater than a number of inlet channels 106 (6 outlets:1 inlet). Further, each inlet channel 106 includes a larger cross-sectional area as compared to the cross-sectional area of each of the outlet channels 108. However, the total cross-sectional area of the inlet channels 106 is less than a total cross-sectional area of the outlet channels 108. Further, the total surface area of the outlet channels 108 is greater than a total surface area of the inlet channels 106, and wherein a catalyst is preferentially located within the outlet channels. In particular, the washcoat 425 is preferentially applied to and disposed on the non-filtration walls 305. Outlet channels 108 comprise irregular pentagons comprising a shape of a baseball home plate.

Figure 16:
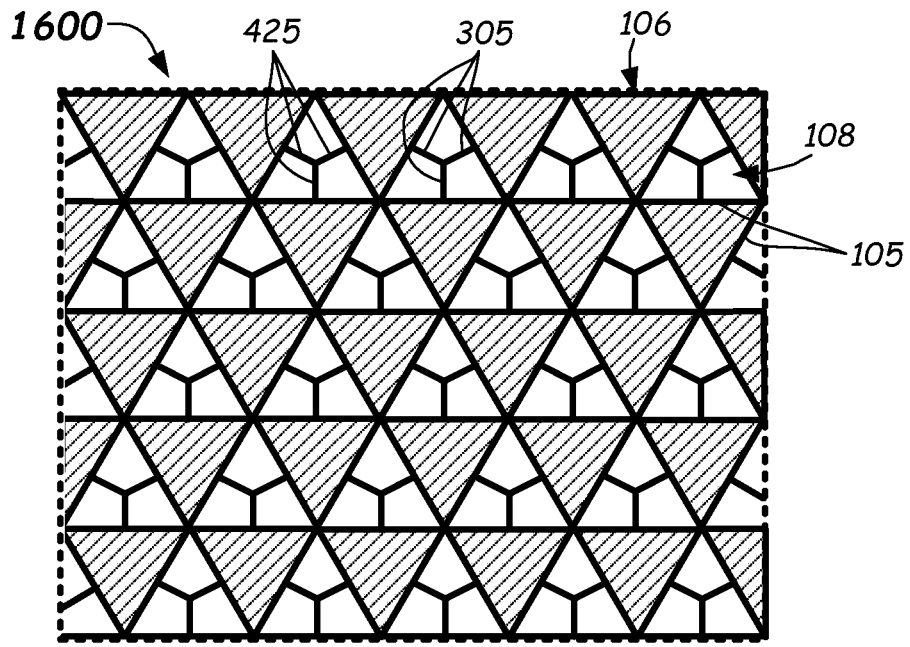

FIG. 16 is an enlarged plan view showing an enlarged portion of an outlet end face in another embodiment of the coated ceramic honeycomb body 1600. In this embodiment, the outlet channels 108 are shown as white triangles and the inlet channels are shown as hatched triangles. As shown, there is one outlet channel 108 for every one inlet channel 106. The non-filtration walls 305 connect across opposing midpoints of the filtration walls in a y-shape configuration. In this embodiment, the number of outlet channels 108 is the same as the number of inlet channels 106 (1 outlet:1 inlet). However, the total surface area of the outlet channels 108 is greater than a total surface area of the inlet channels 106. Further, the catalyst is preferentially located within the outlet channels 108. In particular, the washcoat 425 is preferentially applied to and disposed on the non-filtration walls 305. Outlet subchannels within the outlet channels 108 comprise quadrilaterals that are rhombuses, with a shape of a diamond as shown. Other rhomboid shapes are possible via repositioning the non-filtration walls 305.

Figure 17:
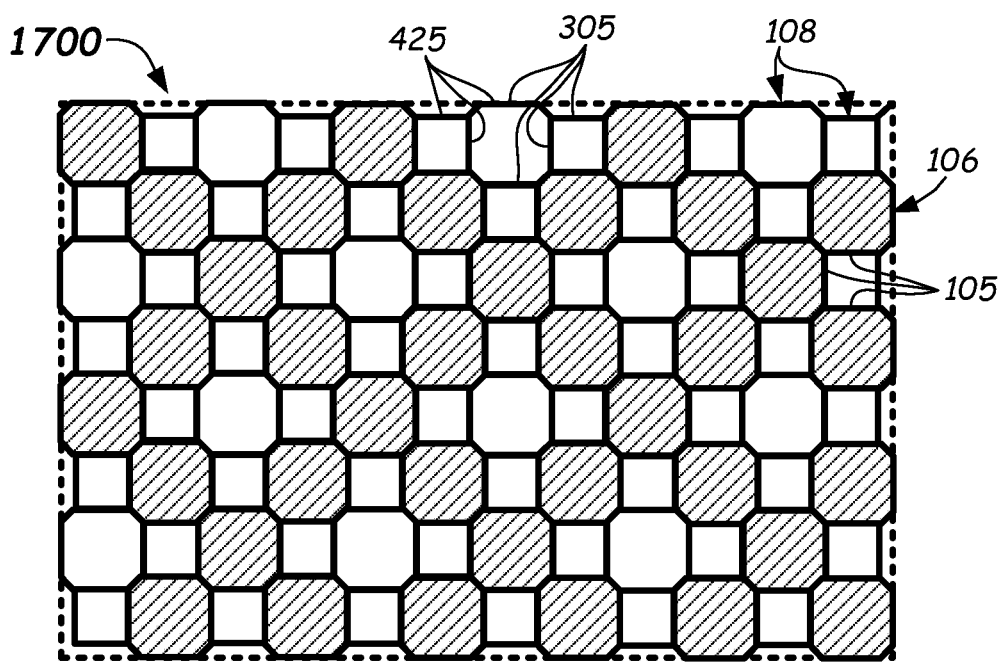

FIG. 17 is an enlarged plan view showing an enlarged portion of an outlet end face of another embodiment of the coated ceramic honeycomb body 1700. In this octagon-square embodiment, the outlet channels 108 are shown in white and the inlet channels 106 are shown as hatched with a modified plug pattern defining the inlet channels 106 and outlet channels 108. The non-filtration walls 305 connect to corners of the filtration walls 105. In this embodiment, the number of outlet channels 108 is greater than the number of inlet channels 106 (15 outlets:9 inlets). Further, the total surface area of all the outlet channels 108 is greater than a total surface area of all the inlet channels 106. Moreover, the catalyst can be preferentially located within the outlet channels 108. In particular, the washcoat 425 can be preferentially applied to and disposed on the non-filtration walls 305.

Figure 18:
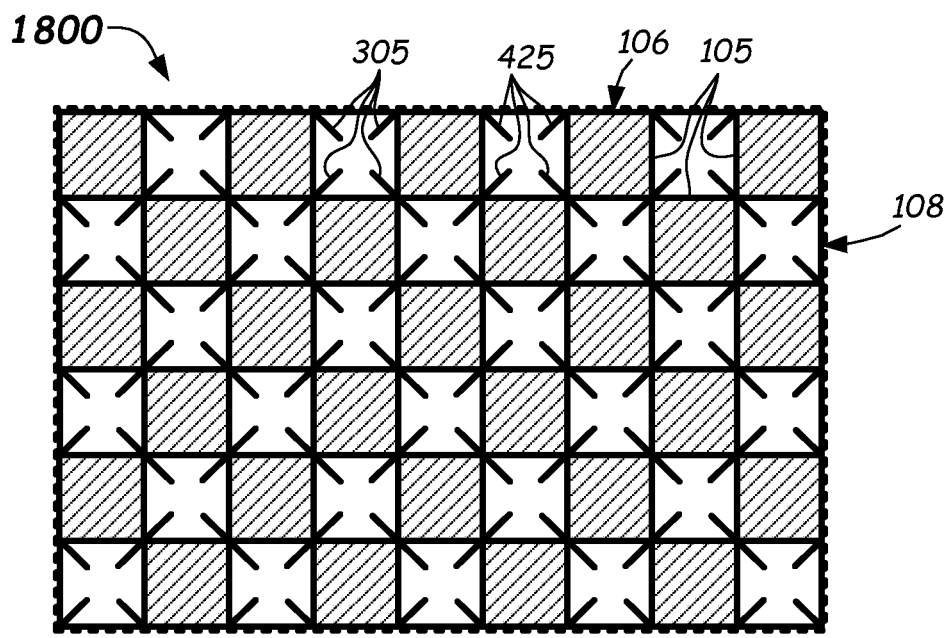

FIG. 18 is an enlarged plan view showing an enlarged portion of an outlet end face in another embodiment of the coated ceramic honeycomb body 1800. In this embodiment, the outlet channels 108 are shown as white squares and the inlet channels 106 are shown as hatched squares. The outlet channels 108 can comprise non-filtration walls 305 extending into the outlet channels 108, like fins. The non-filtration walls 305 connect to corners of the filtration walls 105 and extend part way across the outlet channel 108 towards the opposing corner. In this embodiment, the number of outlet channels 108 is the same as the number of inlet channels 106 (1 outlet:1 inlet). However, the total surface area of all the outlet channels 108 is greater than a total surface area of all the inlet channels 106. Moreover, the catalyst can be preferentially located within the outlet channels 108. In particular, the washcoat 425 can be preferentially applied to and disposed on the non-filtration walls 305 (fins).

Figure 19:
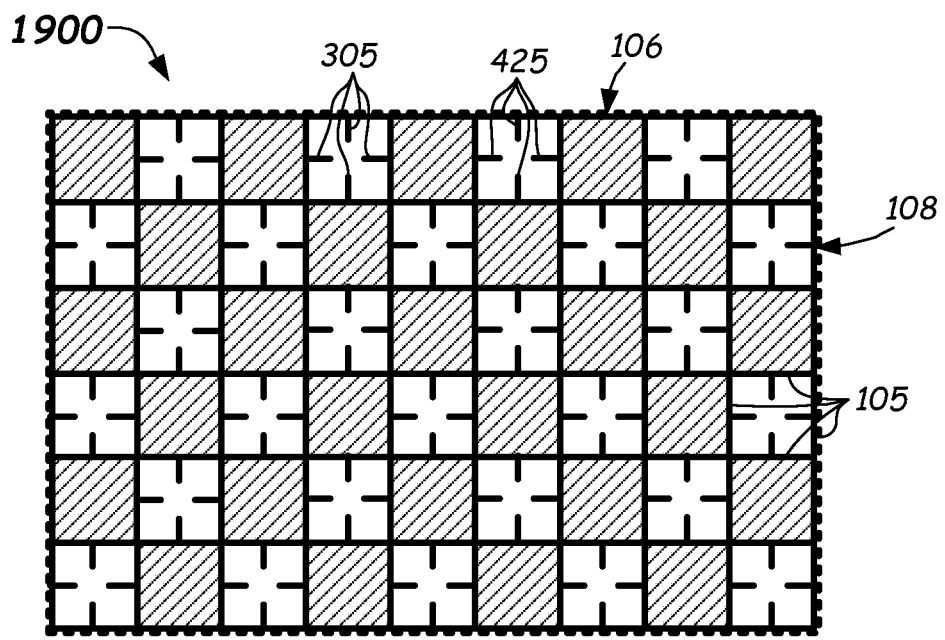

FIG. 19 is an enlarged plan view showing an enlarged portion of an outlet end face in another embodiment of the coated ceramic honeycomb body 1900. In this embodiment, the outlet channels 108 are shown as white squares and the inlet channels 106 are shown as hatched squares. The outlet channels 108 comprise non-filtration walls 305 extending into the outlet channels 108, like fins. The non-filtration walls 305 connect to midpoints of the filtration walls 105, such as between the corners thereof. In this embodiment, the number of outlet channels 108 is the same as the number of inlet channels 106 (1 outlet:1 inlet). However, the total surface area of all the outlet channels 108 is greater than a total surface area of all the inlet channels 106. Moreover, the catalyst can be preferentially located within the outlet channels 108. In particular, the washcoat 425 can be preferentially applied to and disposed on the non-filtration walls 305 (fins).

Figure 20:
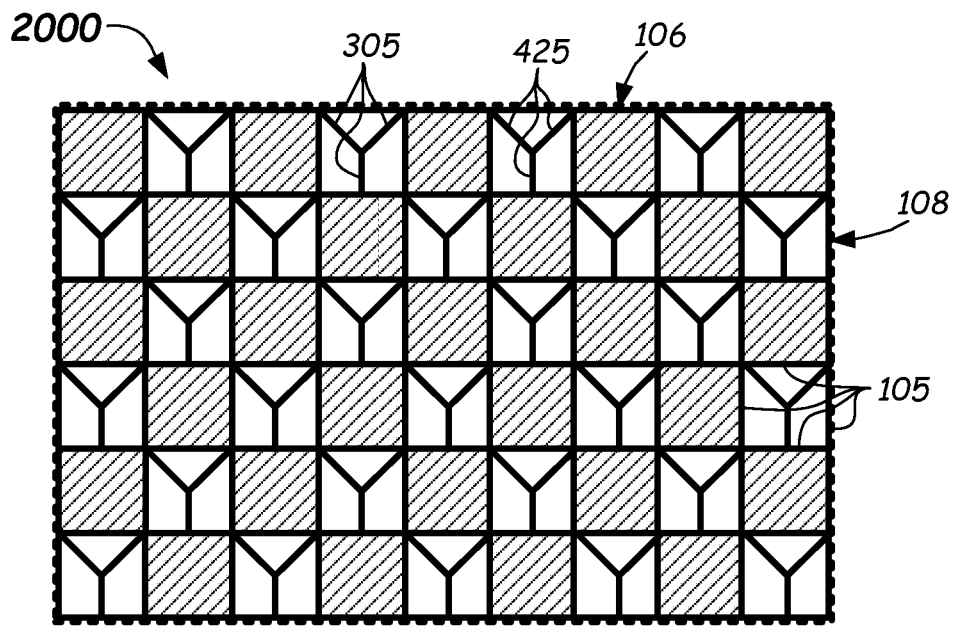

FIG. 20 is an enlarged plan view showing an enlarged portion of an outlet end face in another embodiment of the coated ceramic honeycomb body 2000. In this embodiment, the outlet channels 108 are shown as white squares and the inlet channels 106 are shown as hatched squares. The outlet channels 108 comprise non-filtration walls 305 extending into and subdividing the outlet channels 108 into subchannels. The non-filtration walls 305 connect to a midpoint of one of the filtration walls 105, and the other two connect to corners thereof. Thus, the non-filtration walls 305 connect to the filtration walls 105 in a y-shape configuration. In this embodiment, the number of outlet channels 108 is the same as the number of inlet channels 106 (1 outlet:1 inlet). However, the total surface area of all the outlet channels 108 is greater than a total surface area of all the inlet channels 106 due to the presence of the non-filtration walls. Moreover, the catalyst can be preferentially located within the outlet channels 108. In particular, the washcoat 425 can be preferentially applied to and disposed on the non-filtration walls 305.

Figure 21:
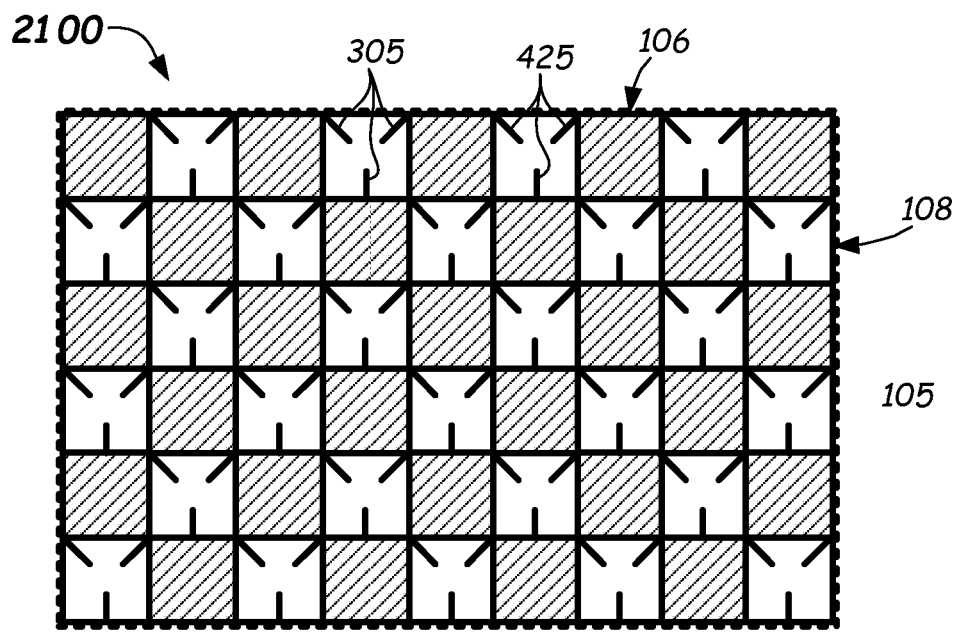

FIG. 21 is an enlarged plan view showing an enlarged portion of an outlet end face in another embodiment of the coated ceramic honeycomb body 2100. In this embodiment, the outlet channels 108 are shown as white squares and the inlet channels 106 are shown as hatched squares. The outlet channels 108 comprise non-filtration walls 305 extending into the outlet channels 108, like fins. The non-filtration walls 305 connect to midpoints and corners of the filtration walls 105. In this embodiment, the number of outlet channels 108 is the same as the number of inlet channels 106 (1 outlet:1 inlet). However, the total surface area of all the outlet channels 108 is greater than a total surface area of all the inlet channels 106. Moreover, the catalyst can be preferentially located within the outlet channels 108. In particular, the washcoat 425 can be preferentially applied to and disposed on the non-filtration walls 305 (fins).

Figure 22:
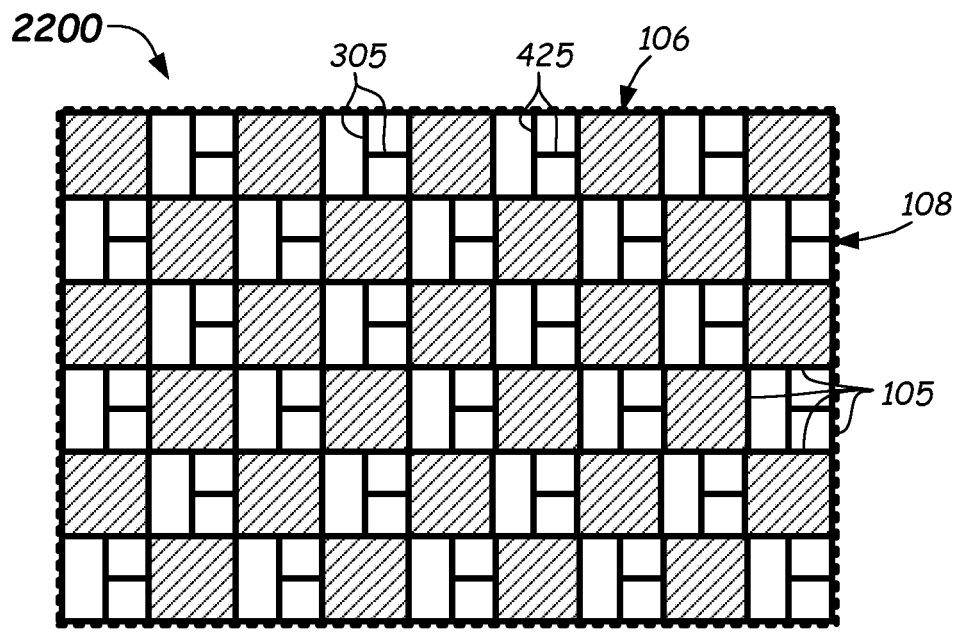

FIG. 22 is an enlarged plan view showing an enlarged portion of an outlet end face in another embodiment of the coated ceramic honeycomb body 2200. In this embodiment, the outlet channels 108 are shown as white squares and the inlet channels 106 are shown as hatched squares. The outlet channels 108 comprise non-filtration walls 305 extending into and subdividing the outlet channels 108 into two types of subchannels, such as rectangular and square subchannels shown. The non-filtration walls 305 connect to a midpoint of the filtration walls 105. In this embodiment, the number of outlet channels 108 is the same as the number of inlet channels 106 (1 outlet:1 inlet), and the total surface area of all the outlet channels 108 is greater than a total surface area of all the inlet channels 106 due to the presence of the non-filtration walls 305. Moreover, the catalyst can be preferentially located within the outlet channels 108. In particular, the washcoat 425 can be preferentially applied to and disposed on the non-filtration walls 305.

Figure 23:
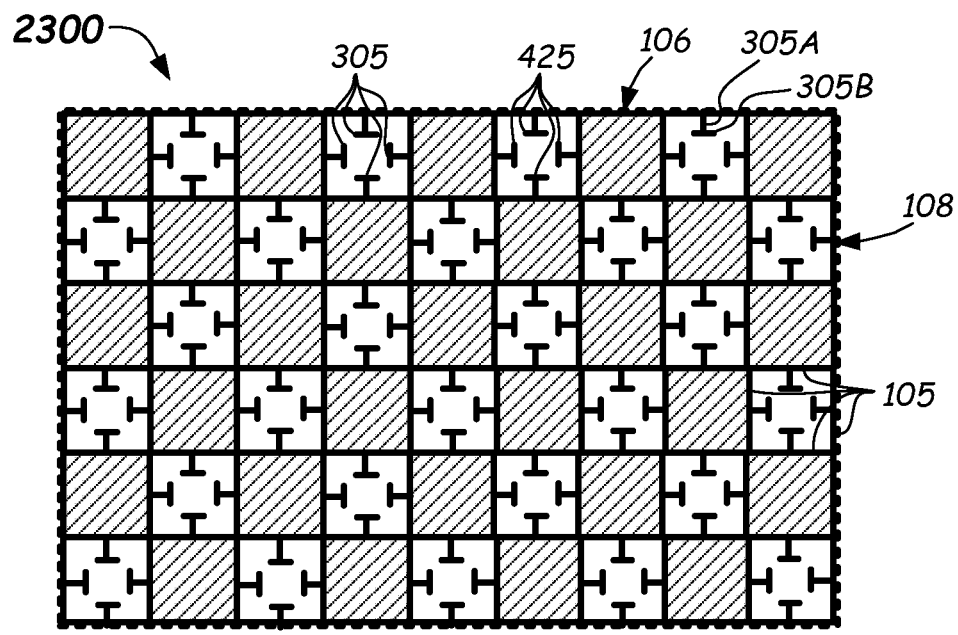
Figure 24:
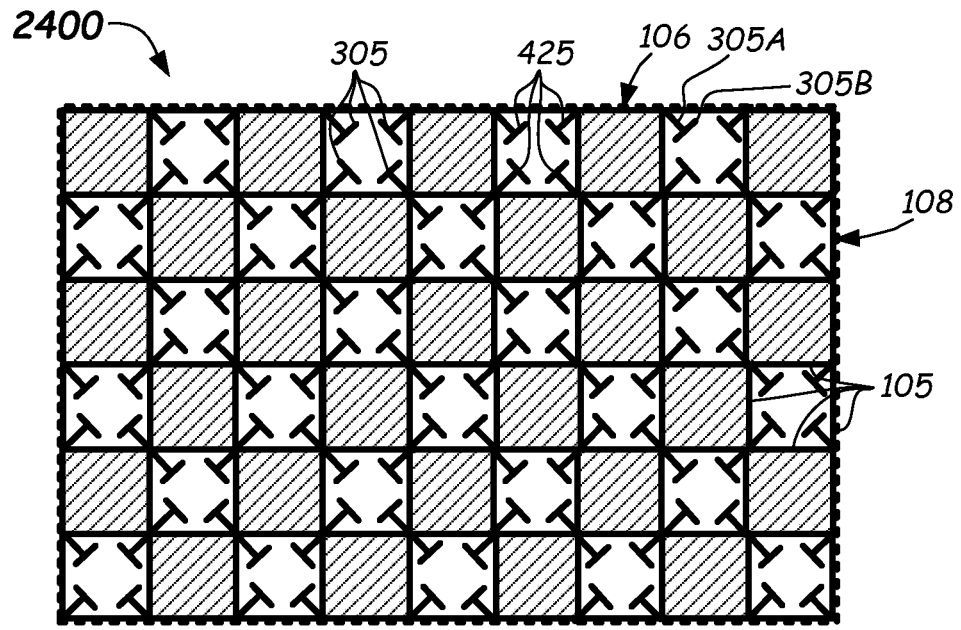
Figure 25:
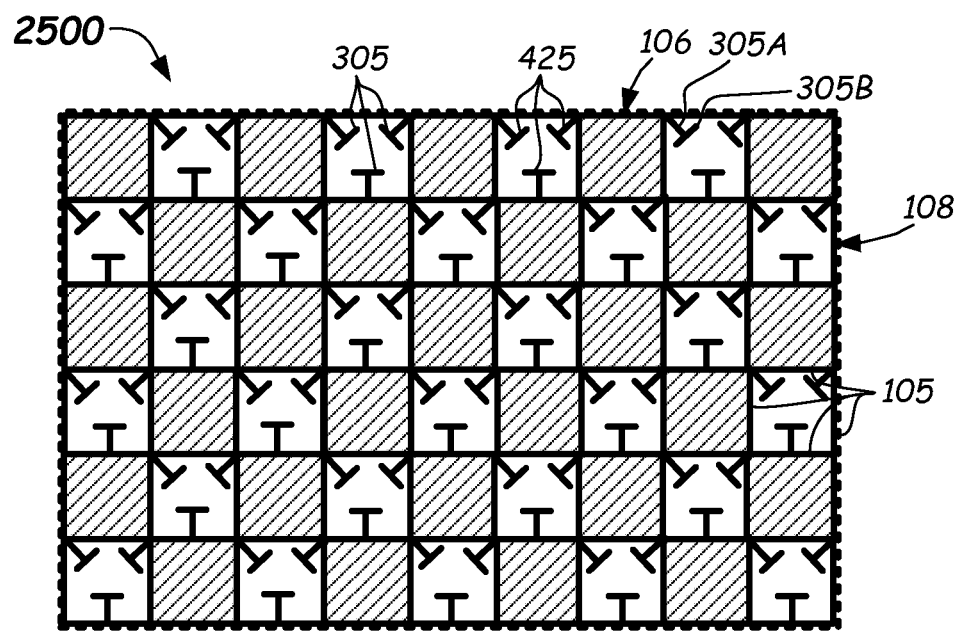

FIGS. 23-25 illustrate enlarged plan views showing enlarged portions of outlet end faces of other embodiments of a coated ceramic honeycomb body 2300, 2400, 2500, respectively. In these embodiments, the outlet channels 108 are shown as white squares and the inlet channels 106 are hatched squares. The outlet channels 108 comprise non-filtration walls 305 extending into the outlet channels 108, like fins. The non-filtration walls 305 connect to midpoints (FIG. 23) of the filtration walls 105, corners (FIG. 24) of the filtration walls 105, and combinations of midpoints and corners (FIG. 25) of the filtration walls 105. In this embodiment, the number of outlet channels 108 is the same as the number of inlet channels 106 (1 outlet:1 inlet). However, in each embodiment, the total surface area of all the outlet channels 108 is much greater than a total surface area of all the inlet channels 106. Moreover, the catalyst can be preferentially located within the outlet channels 108. In particular, the washcoat 425 can be preferentially applied to and disposed on the non-filtration walls 305 (fins). In each embodiment, the non-filtration walls 305 comprise fins comprising a first fin portion 305A that connects to the filtration wall 105 (at midspan or at the corner) and a second fin portion 305B that couples to an end of the first fin portion 305A. The second fin portion 305B may be perpendicular to the first fin portion 305A or optionally at an angle thereto. Second fin portion substantially increase the surface area of the outlet channels 108. Other configurations of the second fin portion 305B can be used.

Figure 26:
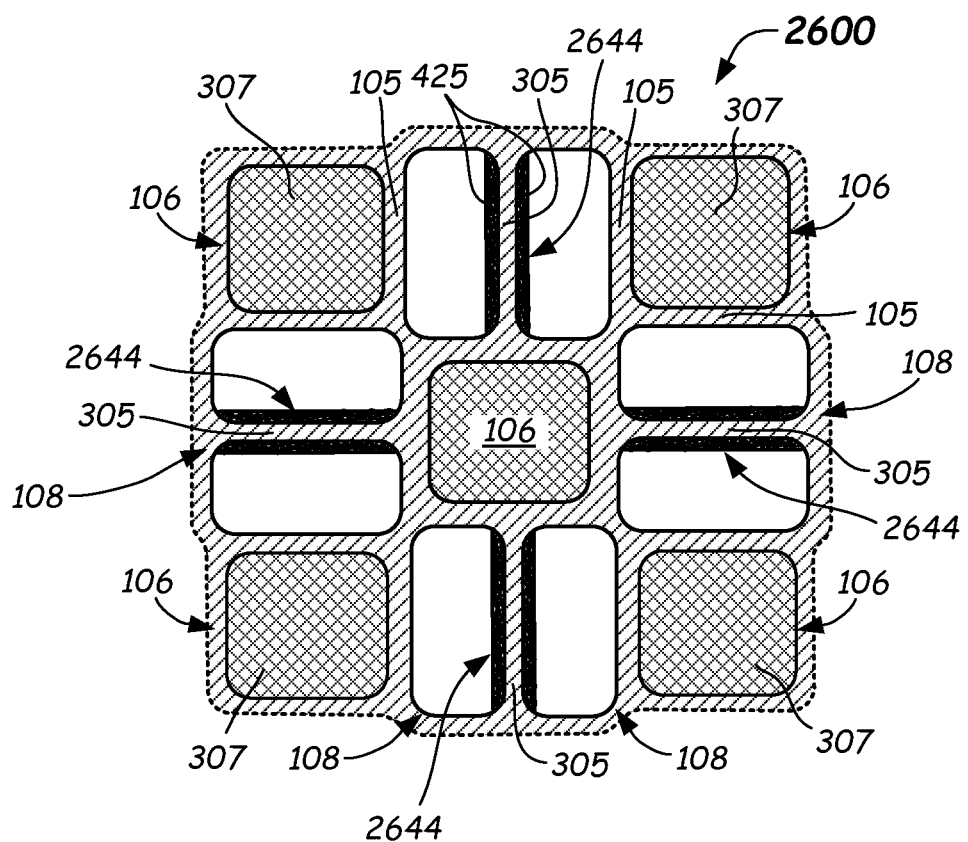

FIG. 26 illustrates enlarged plan view showing enlarged unit cell of an outlet end face of another embodiment of a coated ceramic honeycomb body 2600. In this embodiment, the outlet channels 108 are shown as white squares and the inlet channels 106 are hatched squares. The corners of the channels are provided with a suitable radius (or fillet). The outlet channels 108 comprise non-filtration walls 305 that are provided in the form of a single wall. However, other configurations may be used. The non-filtration walls 305 connect to midpoints of the filtration walls 105.

In this embodiment, the number of outlet channels 108 is the same as the number of inlet channels 106 (1 outlet:1 inlet) for the honeycomb body when fully populated with like units cells. However, in each embodiment, the total surface area of all the outlet channels 108 is greater than a total surface area of all the inlet channels 106 because the outlet channels 108 are larger in cross sectional area and further because the outlet channels 108 include one or more non-filtration walls 305 therein. Moreover, the catalyst can be preferentially located within the outlet channels 108. In particular, the washcoat 425 can be preferentially applied to and disposed on the non-filtration walls 305.

In the embodiment of coated honeycomb body 2600 shown, the honeycomb structure comprises a matrix of intersecting porous walls forming a plurality of axially-extending channels, at least some of the plurality of axially-extending channels are plugged with plugs 307 on the outlet end 104 to form inlet channels 106 and plugged on an inlet end 102 to form outlet channels 108, wherein at least some of the outlet channels 108 (all as shown) contain a filler material 2644 and a catalyst (e.g., a selective catalyst reduction catalyst) is preferentially located within the outlet channels 108 and also preferentially disposed on the non-filtration walls 305 and on and in the filler material 2644. Thus, the filler material 2644 includes a higher wt % loading of catalyst than do the filtration walls 105.

One example of a filler material 2644 may be a washcoat that exhibits a relatively high porosity. The slurry used to form the filler material 2644 can contain the desired catalyst or catalysts (e.g., an SCR catalyst, SOx, or three-way catalyst) and a suitable amount of a pore former. The slurry can be applied to the filtration walls 105 and non-filtration walls 305 in the outlet channels 108 by any of the coating methods described herein. After coating, a slurry removal method is performed on the wet-coated honeycomb body. Thereafter, the slurry including the pore former that is preferentially disposed on the non-filtration wall 305 can be calcined. The calcining temperatures for the coated honeycomb bodies can be from 300° C. and 600° C., for example. This calcining burns out the pore former and produces the filler material 2644 including catalyst in the outlet channels 108 and on the non-filtration wall 305 that is highly porous.

The pore former can be any suitable organic material such as hollow polymer microspheres, starch particles (e.g., corn, potato, pea, or other starches), carbon, and the like, that upon burning will produce open and interconnected porosity in the filler material 2644. The pore former can have a median particle diameter $D_{50}$ of between 1 μm and 50 μm, for example. The burnout during calcination can be conducted slowly enough, in an oxygen-controlled environment, or both, to avoid cracking of the coated honeycomb body 2600. The filler material 2644 in the outlet channels 108 can comprise a high amount of porosity, such as above 40% and the catalyst is contained in the filler material 2644.

The current disclosure relates to a ceramic honeycomb bodies for use as a catalyst support with plugged channels comprising inlet channels 106 and outlet channels 108. Inlet channels 106 are open on the inlet end face and plugged on the outlet end face and are devoid of non-filtration walls. Outlet channels are open on the outlet end face and plugged on the inlet end face. The ceramic honeycomb body is characterized by structural features, possibly in combination with microstructural features. First, the ceramic honeycomb body can have a higher total geometric surface area in the outlet channels 108 as compared with the inlet channels 106. In one embodiment, the higher total surface area may be accomplished by having a larger number of outlet channels 108 relative to inlet channels 106. In this embodiment, some of the porous ceramic walls that define the boundaries of the outlet channels 108 comprise filtration walls 105 (which separate inlet channels from outlet channels), and some of the porous ceramic walls which make up the outlet channels 108 can be non-filtration walls (which separate neighboring outlet channels 108 or subdivide outlet channels 108).

In another embodiment, the increased total surface area in the outlet channels may be accomplished by the incorporation of non-filtration walls, like fins, that extend into the outlet channel 108 within the outlet channels and that increase the surface area relative to the inlet channels 106, wherein the fins include a terminal end or ends within the outlet channel 108.

Further, the disclosure is characterized by a catalyst (e.g., a SCR catalyst or other catalyst) located preferentially within the outlet channels 108 and preferably, the catalyst is loaded preferentially on or within the pore structure of the non-filtration walls 305 within the outlet channels 108. In some embodiments, the porosity is controlled to be in one of two categories: Category 1 is a low to intermediate porosity body having porosity in the range from 40%-60% porosity with median pore diameter from 8 µm to 16 µm. This pore structure is intended to support on-wall catalyst loading. On-wall catalyst loading has the advantages of improved catalytic activity relative to in-wall loading (and therefore can support reduced catalyst loads), and additionally, catalyst preferentially located on the non-filtration walls 305 allows for better separation from the soot on the inlet channels 106 due to the reduced catalyst in the filtration walls 105. This allows for better passive regeneration of the soot in the inlet channels 108 since there is no competition with the catalyst for $NO_2$. Low porosity also enables thinner wall geometries at a similar bulk density and therefore designs having higher open frontal area than conventional designs are possible. The higher open frontal area (OFA) can be provided due to the offsetting effect of less on-wall catalyst on the filtration walls 105.

Category 2 is a high porosity body that can support in-wall catalyst loading or a combination of in-wall and on-wall catalyst loading. The porosity, in this case, can range from 55% to 75% and the median pore diameter can be between about 14 µm and 30 µm. In some embodiments, the porous walls comprise an average bulk porosity in a range from 60% to 70% and a median pore diameter of from 14 µm to 25 µm. This porosity and median pore diameter is particularly effective as a catalyst support for SCR catalysts when the channel density is between 250 (23 cells/cm²) and 450 cpsi (68 cells/cm²) and transverse wall thickness is between even between 0.006 (0.15 mm) to 0.014 inch (0.36 mm).

The coarser pore structure may enable distribution of catalyst within the wall porosity of the non-filtration walls 305. The advantage of in-wall catalyst loading is that it limits the reduction in hydraulic diameter of the channels (e.g., outlet channels 108) where washcoat material is preferentially loaded. Since the catalyst can be predominantly in the non-filtration wall 305, it may not appreciably constrict the outlet channels 108 and therefore the outlet channels 108 avoid a reduction in hydraulic diameter that can occur with on-wall coating.

In each of the embodiments described herein, the honeycomb body 100-2600 may comprise a porous ceramic material such as cordierite, aluminum titanate, combinations of cordierite and aluminum titanate, mullite, silicon carbide, zirconia, and the like, and combinations thereof. Other suitable porous ceramic or other porous materials can be used. The transverse wall thickness of the filtration walls 105 can range from about 0.006 inch (0.15 mm) to 0.020 inch (0.51 mm), or even between 0.006 inch (0.15 mm) to 0.014 inch (0.36 mm), for example. The non-filtration walls 305 can be thinner or the same thickness as the filtration walls 105. The channel density of the honeycomb bodies 100-2600 can range from about 200 cpsi (31 cells/cm²) to 600 cpsi (91 cells/cm²), and from 250 (23 cells/cm²) and 450 cpsi (68 cells/cm²) in some further embodiments, for example.

The unique combination of both filtration walls 105 and non-filtration walls 305 in the outlet channels 108 enables the preferential coating of the non-filtration walls 305 during the washcoat process. The use of non-filtration walls 305 in the outlet channels 108 and coating methods herein limits the concentration of catalyst in the filtration walls 105 to a level lower than in a conventional SCR filter, thus providing the same catalytic activity, but with lower backpressure.

In addition, methods for coating the ceramic honeycomb bodies are provided. One coating method involves the introduction of the catalyst-containing slurry 524 into the outlet channels 108 and some of the filtration walls 105 and subsequently blowing off and possibly draining off or pushing out any excess via pressure or vacuum extraction. The extraction process reduces the catalyst loading in and on the filtration walls 105 relative to the non-filtration walls 305.

In a conventional SCR filter, a high porosity wall flow filter of conventional checkerboard design is employed. SCR catalyst is loaded on and/or within the walls of both the inlet channels and the outlet channels. In order to meet the NOx emissions targets, a relatively-high catalyst loading is used. The high catalyst loading can significantly reduce the permeability of the filter walls, resulting in a relatively high-pressure drop (backpressure). In the current state of the art design, all of the ceramic surface area available to the catalyst is also functioning as filtration walls. In the present coated ceramic honeycomb body 100, the outlet channels 108 have non-filtration walls (e.g., ceramic non-filtration walls 305), which hold catalyst material but are not functioning as filtration walls 105. This additional surface area for catalyst application allows for a lower concentration of catalyst in the filtration walls 105 than would be found in conventional designs. This results in the permeability of the filtration walls 105 being higher than in the conventional coated ceramic honeycomb bodies.

The pore structure of the ceramic honeycomb body can dictate whether the catalyst is applied to the outside of the ceramic walls, or inside the pores of the ceramic walls. When an on-wall coating is desired, the pore structure should have a total porosity between 40% and 60% and a median pore diameter between about 10 µm to 16 µm. On-wall catalyst loading has the advantages of improved catalytic activity relative to in-wall loading (and therefore can support reduced catalyst loads), and additionally when the catalyst is located on the non-filtration walls, it allows for better separation from the soot on the inlet channels. This can allow for improved passive regeneration of the soot in the inlet channels 106 since there is no competition with the catalyst for $NO_2$. Low porosity also enables thinner wall geometries at a similar bulk density and therefore designs having higher open frontal area than conventional SCR filter designs are possible. The finer pore structure assists with good filtration efficiency.

In order to minimize the catalyst loading on the filtration walls 105, a coating method has been developed wherein a slurry 524 containing catalyst material is introduced into the outlet channels 108. The catalyst adheres to and or penetrates into the porous walls comprising the outlet channels (both filtration walls 105 and non-filtration walls 305). To minimize the deposition of slurry 524 on or within the filtration walls 105, a gas (e.g., air may be injected into the inlet channels 106 and some of it is forced through the filtration walls 108, redirecting catalyst-containing slurry 524 out of and away from the filtration walls 105. Meanwhile, the catalyst loading on the non-filtration walls 305 can remain relatively undisturbed.

The coated ceramic honeycomb body 100 comprises a design where some ceramic material is relocated from the filtration wall 105 to the non-filtration walls 305 within the outlet channels 108, while maintaining approximately the same bulk density. This allows for the filtration walls 105 to be thinner relative to conventional designs at the same OFA, which can reduce the through-wall contribution to pressure drop. In addition, it provides an increase in geometrical surface area (GSA) such that the same catalyst loading results in a lower local catalyst density, increasing the permeability of the filtration walls 105. The increase in GSA is also expected to increase catalytic activity.

A method of manufacturing a coated ceramic honeycomb body that can be used in a wall-flow honeycomb filter is disclosed. The method comprises forming a plugged ceramic honeycomb body (e.g., any of the plugged honeycomb bodies shown herein), such as by extrusion, and then drying, firing, and plugging via conventional plugging methods. The method further comprises preparing a slurry 524 (e.g., a slurry of inorganic particulates and comprising a catalyst or catalyst precursors dispersed in a vehicle such as water), the amount of catalyst or catalyst precursors in the slurry 524 and the volume of slurry 524 used in the coating method can be selected such that that the final loading of catalyst achieves a desired catalyst loading target.

The method comprises introducing the slurry 524 into the open outlet channels 108 by one of the following (a) masking the inlet end 102 and possibly the skin 103 and immersing the honeycomb body in the slurry 524, (b) attaching a fixture for sealing (such as collar 638) so that pressure can be used to push the slurry 524 into the open outlet channels 108, or (c) attaching a fixture for sealing (like collar 538) to the inlet side so that a low level of vacuum can be applied from the inlet end 102 of the honeycomb body to pull the slurry 524 into the open outlet channels 108. After coating, the method can comprise attaching a second fixture (e.g., like in FIG. 5) or reversing the flow as in FIG. 6, which is used to couple gas flow through the honeycomb body to remove a portion of the slurry 524 from the filtration walls 105 with minimal removal of slurry from the non-filtration walls 305 and thus produce a wet-coated honeycomb body 100W.

While embodiments of this disclosure have been disclosed in example forms, many modifications, additions, and deletions can be made therein without departing from the scope of this disclosure, as set forth in the claims and their equivalents.

What is claimed is:

1. A coated honeycomb body, comprising:
a honeycomb structure comprising a matrix of intersecting porous walls forming a plurality of axially-extending channels, at least some of the plurality of axially-extending channels being plugged to form inlet channels and outlet channels, wherein a total surface area of the outlet channels is greater than a total surface area of the inlet channels, and
wherein some of the porous walls are filtration walls that separate inlet channels from outlet channels and some of the porous walls are non-filtration walls,
wherein the honeycomb structure comprises a pattern of a plurality of central outlet cells surrounded by a plurality of surrounding outlet cells and a plurality of inlet cells,
wherein the central outlet cells are larger in cross-sectional area than the surrounding outlet cells,
wherein the central outlet cells comprise non-filtration walls and the surrounding outlet cells are devoid of non-filtration walls, and
wherein a catalyst is preferentially disposed on the non-filtration walls.

2. The coated honeycomb body of claim 1, wherein the catalyst comprises a selective catalyst reduction catalyst.

3. The coated honeycomb body of claim 1, wherein the inlet channels are substantially devoid of the catalyst.

4. The coated honeycomb body of claim 1, wherein an area ratio of the total surface area of the outlet channels to the total surface area of the inlet channels ranges from 1.2 to 4.0.

5. The coated honeycomb body of claim 1, wherein a total number of outlet channels is greater than a total number of inlet channels.

6. The coated honeycomb body of claim 1, wherein a cross-sectional area of the outlet channels is greater than a cross sectional area of inlet channels.

7. The coated honeycomb body of claim 1, wherein the catalyst being preferentially disposed comprises CR≤0.8, wherein CR is a coating ratio defined as an average % loading of a washcoat containing the catalyst on and within the filtration walls divided by an average % loading of the washcoat containing the catalyst on and within the non-filtration walls.

8. The coated honeycomb body of claim 7, wherein the catalyst being preferentially disposed comprises 0.2≤CR≤0.8.

9. The coated honeycomb body of claim 1, wherein the porous walls have average bulk porosity in a range from 40% to 60%.

10. The coated honeycomb body of claim 9, wherein the porous walls have a median pore diameter from 8 μm to 16 μm.

11. The coated honeycomb body of claim 1, wherein the porous walls comprise average bulk porosity from 55% to 75%.

12. The coated honeycomb body of claim 11, wherein the porous walls comprise a median pore diameter from 14 μm to 30 μm.

13. The coated honeycomb body of claim 1, comprising rectangular-shaped inlet channels and square-shaped outlet channels.

14. The coated honeycomb body of claim 1, wherein the non-filtration walls connect different corners and/or sides of the filtration walls.

15. The coated honeycomb body of claim 1, wherein some axially-extending channels comprise unplugged pass-through channels.

16. The coated honeycomb body of claim 1, comprising octagonal inlet channels and outlet channels comprising octagonal polygons and squares wherein a cross-sectional area of the square outlet channels is smaller than a cross-sectional area of the octagonal outlet channels.

17. The coated honeycomb body of claim 1 wherein the non-filtration walls connect across midpoints of the filtration walls.

18. The coated honeycomb body of claim 1 further comprising rectangular-shaped inlet channels.

19. The coated honeycomb body of claim 18 wherein the rectangular-shaped inlet channels have a larger cross-sectional area than the surrounding outlet cells.

20. The coated honeycomb body of claim 19 wherein the surrounding outlet cells are square-shaped.

21. The coated honeycomb body of claim 19 wherein the central outlet cells are square-shaped.

22. A coated honeycomb body, comprising:
a honeycomb structure comprising a matrix of intersecting porous walls forming a plurality of axially-extending channels, at least some of the plurality of axially-extending channels being plugged at an outlet end to form inlet channels and plugged at an inlet end to form outlet channels, and
wherein the honeycomb structure comprises a pattern of a plurality of central outlet cells surrounded by a plurality of surrounding outlet cells and a plurality of inlet cells,
wherein the central outlet cells are larger in cross-sectional area than the surrounding outlet cells,
wherein the central outlet cells comprise non-filtration walls and the surrounding outlet cells are devoid of non-filtration walls,
wherein some of the outlet channels are larger in cross-sectional area than at least some of the inlet channels, and a catalyst-containing washcoat is preferentially disposed on the non-filtration walls, and $$0.2 \leq CR \leq 0.8$$

wherein CR is a coating ratio defined as an average % loading by weight of a washcoat containing the catalyst on and within filtration walls divided by an average % loading by weight of the washcoat containing the catalyst on and within the non-filtration walls.

23. A coated honeycomb body, comprising:
a honeycomb structure comprising a matrix of intersecting porous walls forming a plurality of axially-extending channels, at least some of the plurality of axially-extending channels being plugged on an outlet end to form inlet channels and plugged on an inlet end to form outlet channels, wherein at least some of the outlet channels contain a filler material and a selective catalyst reduction catalyst is preferentially located within the filler material,
wherein some of the porous walls are filtration walls that separate inlet channels from outlet channels and some of the porous walls are non-filtration walls,
wherein the honeycomb structure comprises a pattern of a plurality of central outlet cells surrounded by a plurality of surrounding outlet cells and a plurality of inlet cells,
wherein the central outlet cells are larger in cross-sectional area than the surrounding outlet cells,
wherein the central outlet cells comprise non-filtration walls and the surrounding outlet cells are devoid of non-filtration walls.

* * * * *